United States Patent
Sollish et al.

(10) Patent No.: US 7,069,491 B2
(45) Date of Patent: Jun. 27, 2006

(54) COPY PROTECTED DVD AND METHOD FOR PRODUCING AND VALIDATING SAME

(75) Inventors: Baruch Sollish, Emmanuel (IL); Moshe Brody, Kfar Saba (IL)

(73) Assignee: Macrovision Europe Limited, Maidenhead (GB)

( * ) Notice: Subject to any disclaimer, the term of this patent is extended or adjusted under 35 U.S.C. 154(b) by 833 days.

(21) Appl. No.: 09/993,916

(22) Filed: Nov. 27, 2001

(65) Prior Publication Data
US 2002/0069389 A1 Jun. 6, 2002

Related U.S. Application Data

(60) Provisional application No. 60/252,894, filed on Nov. 27, 2000.

(51) Int. Cl.
*H03M 13/00* (2006.01)

(52) U.S. Cl. ............ 714/758; 713/193; 714/784

(58) Field of Classification Search ........ 714/758, 714/703, 755, 784; 369/116, 59.24, 59.25, 369/13.38; 386/95; 341/59; 380/201; 713/193; 360/53
See application file for complete search history.

(56) References Cited

U.S. PATENT DOCUMENTS

| | | | | |
|---|---|---|---|---|
| 5,198,813 A * | 3/1993 | Isozaki | .................. | 341/59 |
| 5,563,947 A * | 10/1996 | Kikinis | .................. | 705/51 |
| 6,072,759 A * | 6/2000 | Maeda et al. | .......... | 369/59.25 |
| 6,188,659 B1 * | 2/2001 | Mueller et al. | .......... | 369/59.24 |
| 6,266,299 B1 * | 7/2001 | Oshima et al. | .......... | 369/13.38 |
| 6,275,462 B1 * | 8/2001 | Masaki et al. | .......... | 369/116 |
| 6,289,102 B1 * | 9/2001 | Ueda et al. | .......... | 380/201 |
| 6,311,305 B1 * | 10/2001 | Sollish et al. | .......... | 714/784 |
| 6,353,890 B1 * | 3/2002 | Newman | .......... | 713/193 |
| 6,357,030 B1 * | 3/2002 | Demura et al. | .......... | 714/755 |
| 6,360,057 B1 * | 3/2002 | Tsumagari et al. | .......... | 386/95 |
| 6,539,475 B1 * | 3/2003 | Cox et al. | .......... | 713/100 |
| 6,694,023 B1 * | 2/2004 | Kim | .......... | 380/203 |
| 2001/0042230 A1 * | 11/2001 | Williams et al. | .......... | 714/703 |
| 2002/0060874 A1 * | 5/2002 | Choo et al. | .......... | 360/53 |

* cited by examiner

*Primary Examiner*—Albert Decady
*Assistant Examiner*—Dipakkumar Gandhi

(57) ABSTRACT

A copy protected DVD disc and a method for producing and validating the DVD disc is provided. In an embodiment the method for protecting a DVD from being illegally copied includes producing a signature which includes introducing ambiguous symbols into an ECC block and partially disabling the error correction. A DVD encoder for use in producing the copy protected disc is also provided.

31 Claims, 20 Drawing Sheets

| | | | | | | | | | |
|---|---|---|---|---|---|---|---|---|---|
| B0,0 | B0,1 | | B0,170 | B0,171 | B0,172 | | B0,181 | |
| B1,0 | B1,1 | | B0,170 | B0,171 | B1,172 | | B1,181 | |
| B2,0 | B2,1 | | B2,170 | B2,171 | B2,172 | | B2,181 | |
| | | | | | | | | |
| B189,0 | B189,1 | | B189,170 | B189,171 | B189,172 | | B189,181 | |
| B190,0 | B190,1 | | B190,170 | B190,171 | B190,172 | | B190,181 | |
| B191,0 | B191,1 | | B191,170 | B191,171 | B191,172 | | B191,181 | |
| B192,0 | B192,1 | | B192,170 | B192,171 | B192,172 | | B192,181 | |
| | | | | | | | | |
| B207,0 | B207,1 | | B207,170 | B207,171 | B207,172 | | B207,181 | |

FIG.2
PRIOR ART

— 172 bytes — | PI 10 bytes

192 ROWS / PO 16 ROWS

| | NOMINAL RADIUS IN MM | | | SECTOR NUMBER OF THE FIRST PHYSICAL SECTORS | NUMBER OF PHYSICAL SECTORS |
|---|---|---|---|---|---|
| LEAD-IN ZONE INITIAL ZONE | 22.6 MAX. TO 24.0 | | | | |
| REFERENCE CODE ZONE | | | | (02F000) | 32 |
| BUFFER ZONE 1 | | | | (02F020) | 480 |
| CONTROL DATA ZONE | | | | (02F200) | 3072 |
| BUFFER ZONE 2 | | | | (02FE00) | 512 |
| DATA ZONE | 24.0 TO $r_1$ | | | (030000) | |
| LEAD-OUT ZONE | $r_1$ TO 35.0 MIN. WHEN $r_1 < 34.0$ | $r_1$ TO $(r_1+1.0)$ WHEN $34.0 < r_1 < 57.5$ | $r_1$ TO 58.5 WHEN $57.5 < r_1 < 58.0$ | | |

FIG.11
PRIOR ART

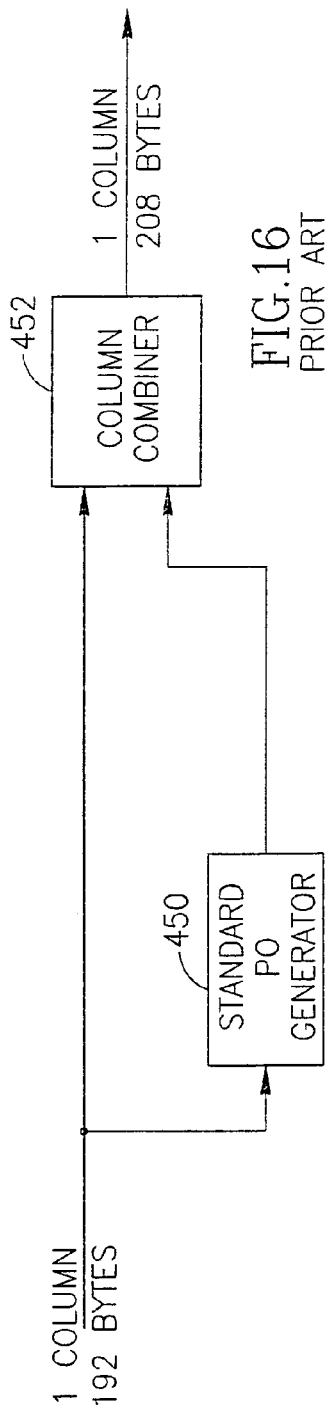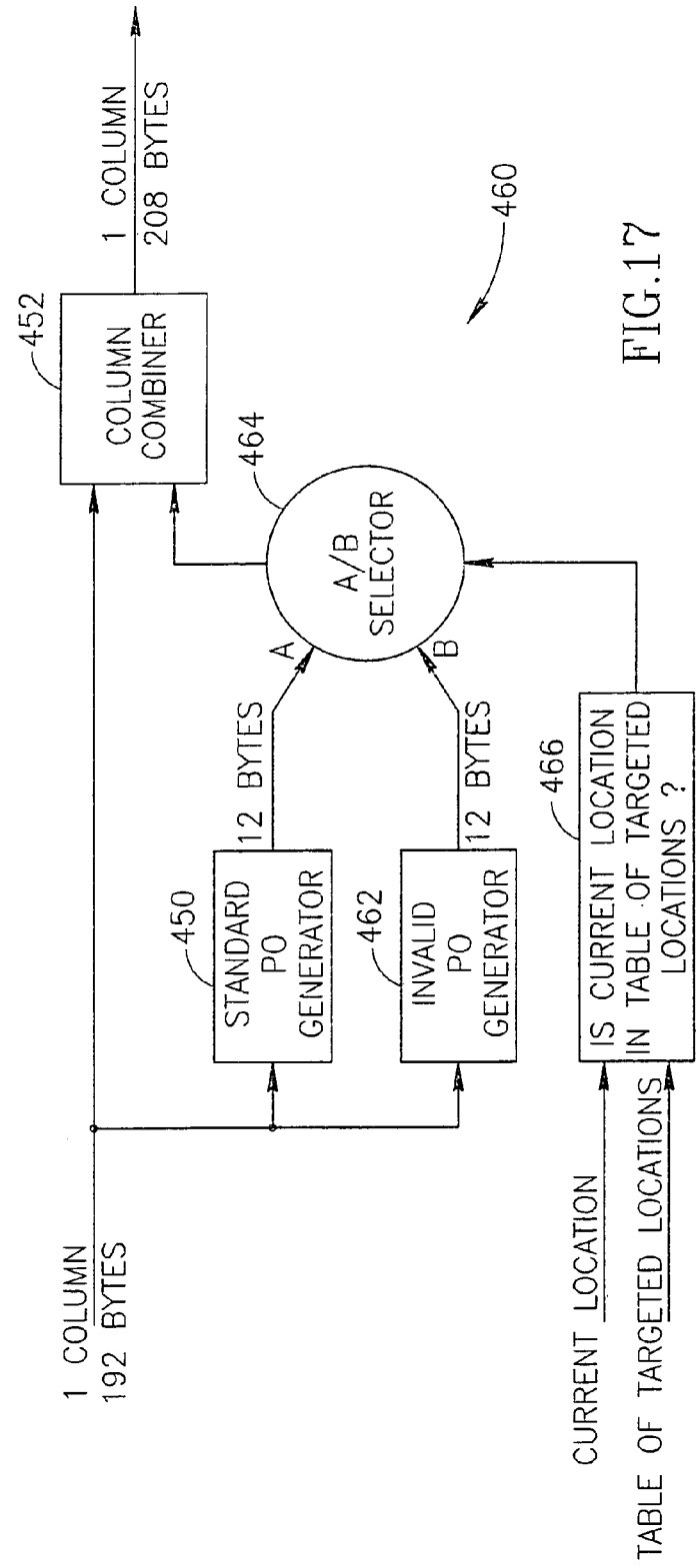

US 7,069,491 B2

COPY PROTECTED DVD AND METHOD FOR PRODUCING AND VALIDATING SAME

CROSS-REFERENCE TO RELATED APPLICATIONS

This application claims the benefit of U.S. Provisional Patent Application Ser. No. 60/252,894, filed Nov. 27, 2000, and entitled "Copy protected digital video disc (DVD)," incorporated herein by reference in its entirety.

FIELD OF THE INVENTION

The present invention relates to copy protection of digital optical discs (DVD) in general.

BACKGROUND OF THE INVENTION

Digital optical discs (referred to as DVD discs) are commonly used to store software applications and content in digital form, typically 4.7 Gigabytes per disc or more. DVD discs come in a variety of formats: manufactured discs, such as DVD-ROM, one time recordable discs, such as DVD-R, and rewritable discs such as DVD-RAM and DVD–RW. DVD-ROM discs are generally mass-produced in a disc-replication manufacturing process that includes glass mastering, electroforming, and stamping. Recordable and rewritable discs are generally produced individually or in small quantities by DVD-recorders containing suitable blank media. DVD-recorders and blank media, together with appropriate "burning" software, are readily accessible to individual consumers.

DVD discs are susceptible to unauthorized replication. Due to the digital nature of DVD, such an unauthorized discs may be essentially identical to authentic ones. Unauthorized discs can be manufactured on a mass-produced basis, or can be recorded by consumers with a computer, DVD-recorder, and blank media. The problem of unauthorized end user recording is growing more acute, now that DVD-recorders are available for a few hundred dollars, and blank media is available for around 5 dollars.

Digital data written to digital optical discs (DVD) undergoes a well-defined series of processing steps including interleaving, Reed-Solomon encoding, and Eight-to-Sixteen encoding (known as EFM-Plus), for DVDs.

EFM+ encodings are physically represented by microscopic patterns of pits and lands (or in the case of rewritable discs, by microscopic regions of lesser and greater reflectivity). An encoded '1' represents a transition between a pit and land (or lesser and greater reflectivity), while an encoded '0' represents a continuation of a pit or land ( or a continuation of lesser or greater reflectivity).

Excessive physical damage to the media surface, such as a scratch, can obscure the precise location of the transitions and thereby corrupt the data reading. To protect against such hazards, the media is written with additional data in the form of error correcting symbols. These are mathematically determined to correspond to the other data written on the media in such a way that the player can use them as it reads the media not only to determine if errors have occurred, but under certain conditions to correct errors. A fixed number of data symbols, together with fixed number of symbols compacted for them form a data structure known as an error correction codeword (ECC). Methods for choosing and implementing appropriate error correction coding are well-known in the art.

In ordinary use, error detection and correction is desirable, as it reduces the probability that the data read from digital optical media and delivered to the user will become corrupted by minor physical damage to the media.

However, making changes to the disc in order to prevent the disc from being illegally copied are likely to be frustrated by the ECC of the DVD.

SUMMARY OF THE INVENTION

The present invention inhibits unauthorized replication or recording of DVD discs by providing one or more means of distinguishing between an authentic disc and an unauthorized copy. One means of copy protection is to store information on a disc that can be read, but not easily reproduced. A further means of copy protection is to store data on a disc in a way such that by reading the data in a special way, it is possible to distinguish between an authentic disc and an unauthorized copy, even if the same data is read from both discs.

DVD discs contain an Information Zone, comprising a Lead-in Zone, Data Zone, and Lead-out Zone (FIGS. 10 and 11). Generally speaking, the Data Zone of a DVD contains the intellectual property to be protected such as software programs or content. DVD recorders are generally capable of faithful duplication of the Data Zone, but not the contents of the Lead-in Zone. Thus the present invention teaches writing data to certain locations in the Lead-in Zone that are generally replaced with default values by DVD recorders. Standard functions allow these locations of the Lead-in Zone to be read from a disc. If the data differs from that written on an authentic disc, the disc under question is an unauthorized copy.

More sophisticated replication systems may allow faithful replication of the Lead-in Zone. The present invention includes additional means of authenticating a DVD disc which overcome the disadvantages of present systems. One embodiment writes information in the Information Zone that cannot easily be read, such as the sector containing a header, error detection CRC and 2048 bytes of data (see FIG. 9). The contents of the header and CRC are prescribed in the DVD standard. If one or more selected sectors are written with any of incorrect header or CRC, the sector is generally unreadable. DVD-readers are generally incapable of reading such "bad" sectors, and DVD-recorders are generally incapable of writing bad sectors. Even more sophisicated mastering systems may not be able successfully to copy bad sectors. Therefore, if one or more bad sectors are written to predetermined locations on an authentic disc, a disc under test is deemed authentic if those sectors cannot be read.

A further embodiment of copy protection is effective against even sophisticated mastering and replication. This embodiment involves generating one or more ambiguous symbols. An ambiguous symbol is one that can decoded into at least 2 possible decoded values. Means for determining and producing ambiguous symbols are described hereinblow.

Generally speaking, a DVD reader will not return sector data determined to be in error. The reader will attempt to read the sector again and again (the number of retries may vary from reader to reader) until the sector is read successfully or the maximum number of retries is exceeded. Additionally, if the predetermined maximum of retries is exceeded, it is possible to request the drive to try again.

Thus, if there is no error in a sector. a reader will return sector data very quickly. If there is a permanent error in a sector, the reader will return an error condition for every read. If however, at least one ambiguous symbol is in the sector, then the reader will generally have to reread the sector one or more times until all the ambiguous symbols decode to their correct values. For example, as described hereinbelow, if a sector contains four ambiguous symbols, for example, each ambiguous symbol having a 50% probability of decoding correctly, that sector is capable of being read correctly in 35 tries or less 90% of the time.

It will be appreciated that ambiguous symbols can only be produced by an encoder modified according to the present invention. Therefore, conventional encoders cannot accurately reproduce a sector containing one or more ambiguities, Such an encoder will either generate a sector with a valid EDC or one with an invalid EDC. In the first case, the sector will be generally be read correctly the first time. In the second case, the sector will never be read correctly. Thus, if a sector containing at least one ambiguous symbol is read correctly in the first try, or never is read correctly when a predetermined maximum number of tries is exceeded, then the disc under test is very likely an unauthorized copy. If however, the sector is read correctly after more than one and less than or equal to the predetermined maximum number of retries, than the disc under test is very likely an authentic one.

It will be appreciated that the Reed-Solomon Product Code specified in the DVD standard will, in general, correct ambiguous symbols. The present invention also describes means of disabling Reed-Solomon error correction for those ambiguous symbols.

The present invention provides improved methods for protecting a DVD from being illegally copied by producing a signature which includes inter alia, introducing ambiguous symbols into an ECC block and partially disabling the error correction. The present invention also provides a method for detecting and validating the signature on the DVD.

There is thus provided in accordance with an embodiment of the invention. a DVD disc which includes at least one sector, configured to require at least two read operations to be read correctly.

There is also provided in accordance with an embodiment of the invention. a DVD disc which includes a signature, the signature having at least one ambiguous symbol inserted into an ECC block during EFM+ encoding and having partially disabled error correction, the partially disabled error correction being produced prior to EFM+ encoding.

There is thus provided in accordance with an embodiment of the invention. a DVD disc which includes a signature having at least one altered component in the lead-in zone of the DVD. Alternatively, the altered sector is in the data zone of the DVD.

There is thus provided in accordance with an embodiment of the invention. a DVD disc which includes at least one appended or replaced sector in the data zone of the DVD; and at least one amended sector in the data zone of the DVD, the at least one sector being generally unreadable.

There is also provided in accordance with an embodiment of the invention. a DVD encoder which includes at least one of the following group including an ECC block invalidator, an invalid Reed-Solomon parity symbol generator, an error correction disabler and an ambiguous symbol generator, and a non-standard sector generator.

There is also provided in accordance with an embodiment of the invention, a table for converting 8-bit coded data into 16-bit code words. The table includes at least one 16-bit code word generally capable of being read in one of at least two possible ways.

In addition, there is also provided in accordance with an embodiment of the invention, a method for producing a signature on a DVD disc. The method includes partially disabling error correction prior to EFM+ encoding; and introducing at least one ambiguous symbol into an ECC block during EFM+ encoding.

Furthermore, there is also provided in accordance with an embodiment of the invention, a method for producing a signature on a digital optical disc (DVD). The method includes generating at least one sector, each of the at least one sectors requiring at least two read operations to be read correctly.

Alternatively, the method includes appending or replacing at least one sector in the data zone of the DVD; and amending at least one sector in the data zone of the DVD so that the at least one sector is generally unreadable.

Alternatively, the method includes altering at least one sector in the data zone of the DVD so that the at least one sector is generally unreadable, or alternatively altering at least one component in the lead-in zone of the DVD.

Furthermore, there is also provided in accordance with an embodiment of the invention, a method for validating a signature on a DVD. The method includes comparing the time to read at least one unprocessed sector within the FCC block with the time to read at least one processed sector within the FCC block. Alternatively, the method for validating a signature on a DVD includes comparing the number of reads for at least one unprocessed sector within the FCC block to be read correctly with the number of reads for at least one processed sector within the ECC block to be read correctly.

BRIEF DESCRIPTION OF THE DRAWINGS

The present invention will be understood and appreciated more fully from the following detailed description taken in conjunction with the appended drawings in which:

FIG. 2 is a diagrammatic representation of a Error Correcting Code (ECC) Block for a DVD;

FIG. 11 is a schematic illustration of an Information Zone in more detail;

FIG. 16 illustrates a standard PO (Outer Priority) generator;

FIG. 17 is a schematic illustration of a PO (Outer Priority) generator operative in accordance with an embodiment of the invention;

Figure 1:
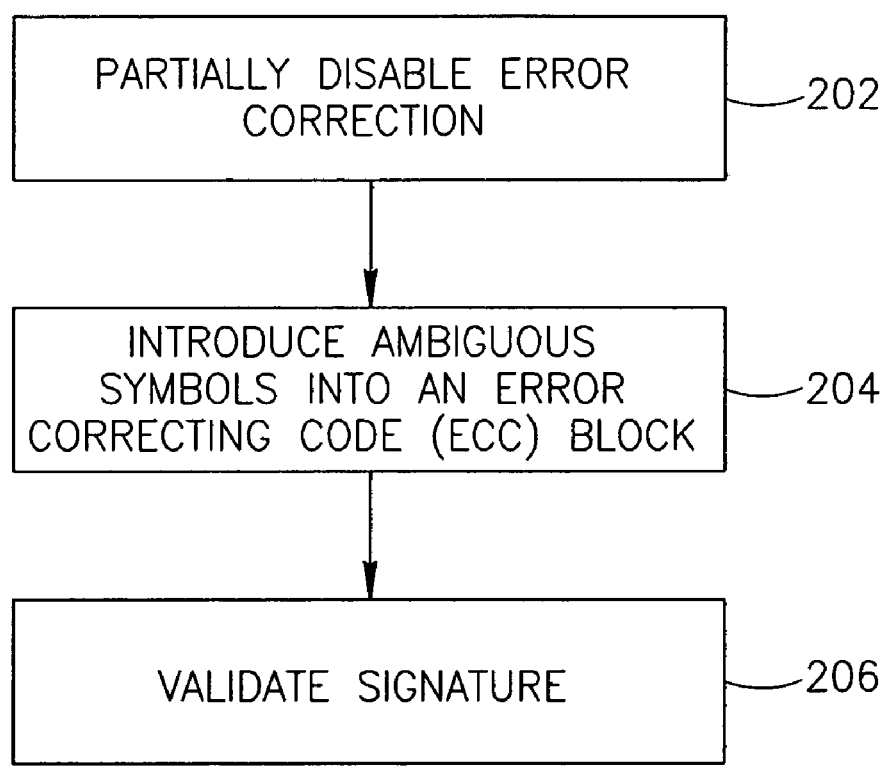
FIG. 1 is a flow chart block diagram illustration for producing a signature that cannot be reproduced illegally operative according to an embodiment of the present invention.

APPENDIX A: Ambiguity Tables For DVD Main and Substitute Tables

STANDARDS/PUBLICATIONS REFERRED TO IN THE PRESENT INVENTION

The following standards/publications (available from website: http://www.ecma.ch) are referred to in the following description:

Optical Disc Specifications DVD family:

Standard ECMA-267 120 mm DVD Read-Only Disk 3rd edition April 2001;

Standard ECMA-272 120 mm DVD Rewritable Disk (DVD-RAM) 2nd edition June 1999;

Standard ECMA-274 Data Interchange on 120 mm Optical Disk using +RW format 2nd edition June 1999;

Standard ECMA-279 80 mm and 120 mm DVD-Recordable Disk (DVD-R) December 1998.

Command Set of DVD Drives:

Small Form Factor committee draft standard Mt. Fuji Commands for Multimedia Devices SFF 8909i v5 revision 1.1 November 2000.

Definitions

The following words/phrases shall have the definitions ascribed thereto in the present invention:

Ambiguity—A non standard pattern of pits and lands on a DVD disc (generated by a non-standard table of EFM+ encodings) that generally may be interpreted by a DVD reader as more than one possible standard EFM+ encodings.

Ambiguous symbol—A non standard EFM+ encoding that results in the production of an ambiguity.

Signature—One or more alterations to a DVD disc that are generally detectable by DVD readers but generally difficult to reproduce by DVD recorders or replication systems.

DETAILED DESCRIPTION OF THE PRESENT INVENTION

The present invention describes methods for copy protecting a digital optical disc (DVD) (herein referred to as DVD or DG-DVD) by producing a signature for the DVD that cannot generally be reproduced illegally. A method for detecting and validating the DVD signature is also described.

A DVD disc is composed of three main zones: Lead-in, Data and Lead-out zones. The DVD signature may have one or more components in the Lead-in Zone, Data Zone, and beyond the Data Zone. The components may be added to the original premaster data.

Signature Components in Lead-in Zone

These signature components may be implemented by a special CONTROL.DAT file that replaces the CONTROL.DAT file generated automatically by the customer's authoring or premastering software. (CONTROL.DAT is one of the standard input files used in the industry which are required for mastering, describing the Control data block of the Lead-in zone).

DVD recorders available to the public consumer are generally incapable of exactly reproducing the control data block. They generally always set BCA descriptor to 0x00. They also generally write default Disc Manufacturing Information Burst Cutting Area (BCA) Descriptor The BCA is a special region of the disc near the hub that may be serialized during mastering or during manufacturing, as specified in Annex H of the DVD specifications.

The presence or absence of BCA data is signaled by the BCA descriptor, located in Byte 16 of the first sector (the Physical format information sector) of each Control data block in the Lead-in zone. If there is no BCA data, the BCA descriptor is set to 0x00. If BCA data is present, the BCA descriptor is set to 0x80.

In the DG-DVD of the present invention, the BCA descriptor is set to 0x80, for example, whether or not BCA data is present.

Disc Manufacturing Information (DMI)

Disc manufacturing information (DMI) is contained in the second sector of each Control block in the Lead-in zone, that is, the sector immediately following the Physical format information sector.

DG-DVD may modify one or more bytes of disc manufacturing information. In particular, if the original disc manufacturing information is 0x00, DG-DVD may selectively change original disc manufacturing information from 0x00 to one of (0x01, 0x08, 0x10, 0x80) for example.

Signature Component in Data Zone

In an embodiment of the present invention, one or more of the Data sectors in the data zone may be modified. The modified sectors may be sectors which are not used or ignored by the content or program.

Figure 9:
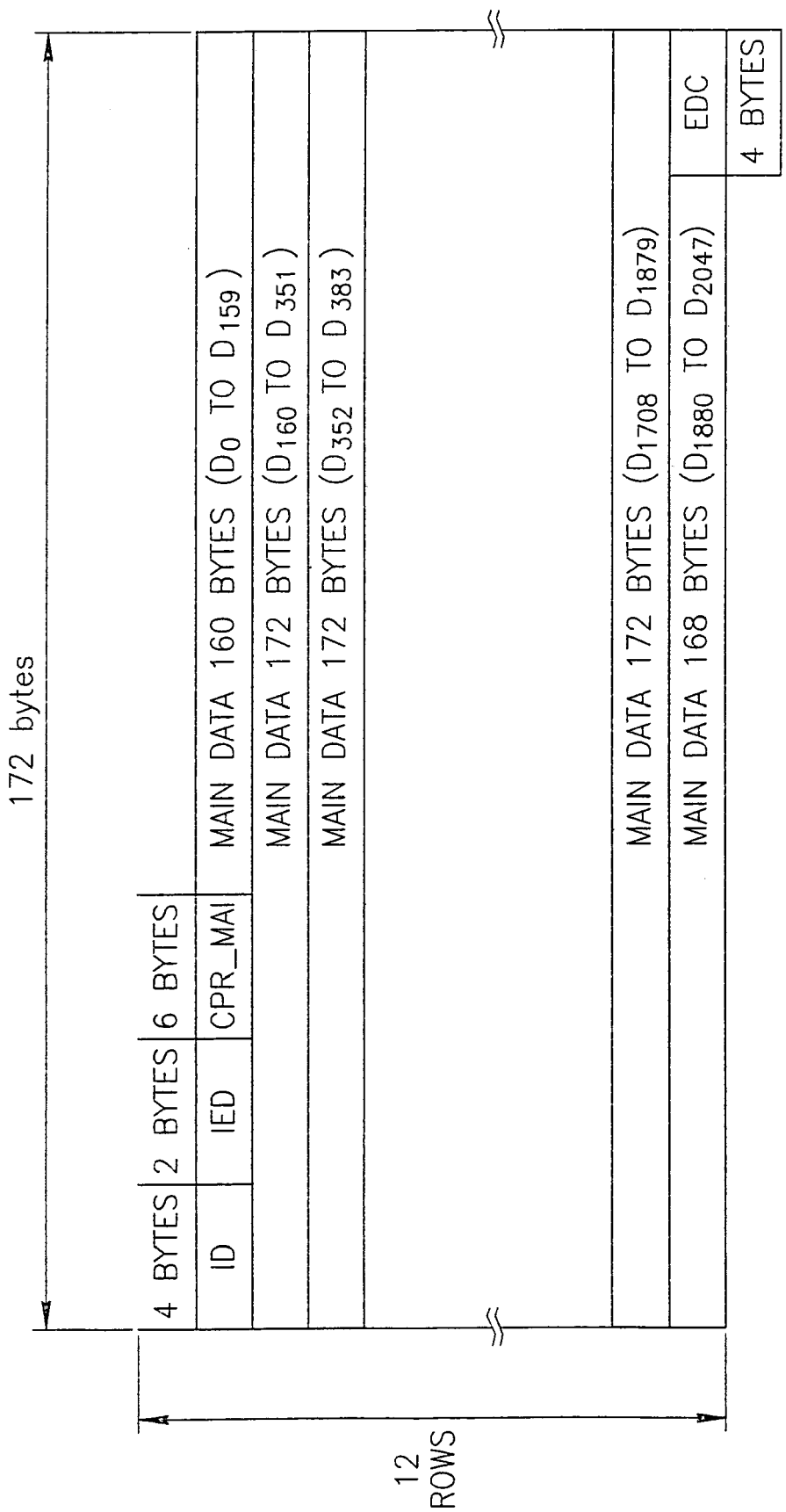
FIG. 9 is a schematic illustration of the components of a DVD sector.
Figure 10:
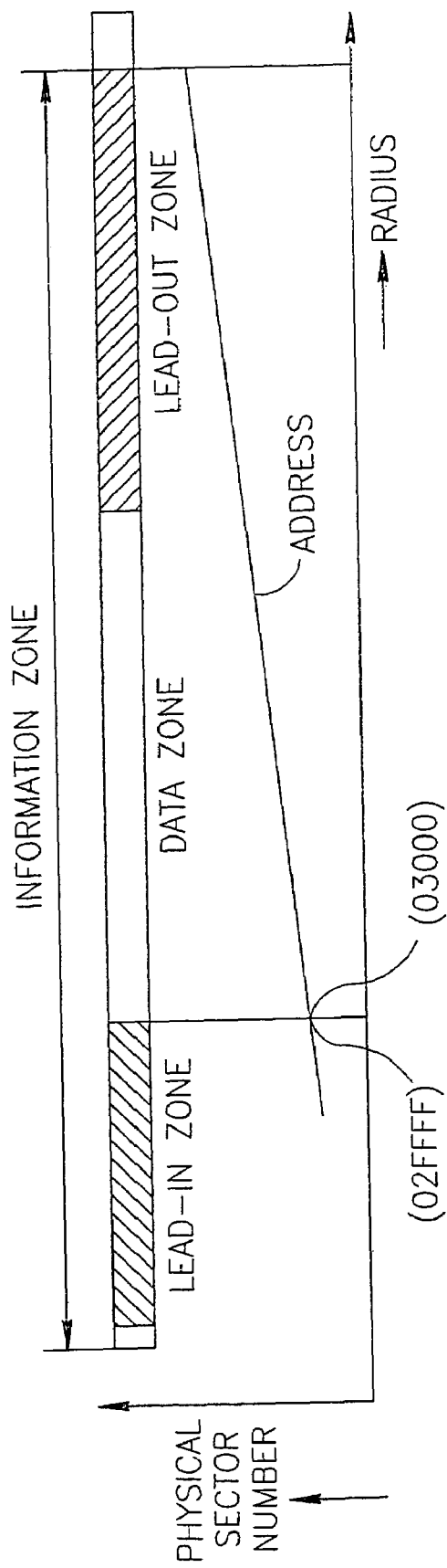
FIG. 10 is a schematic illustration of an Information Zone on a DVD disc.
Figure 12A:
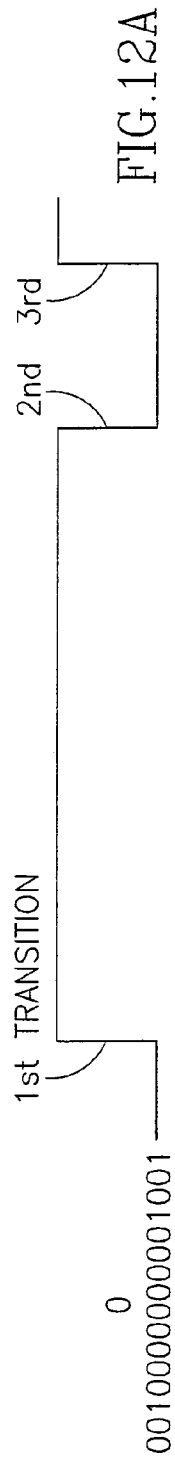
FIG. 12 is a schematic illustration of three data values, respective EFM+ encodings, and respective ambiguous encodings, together with their respective pit and land patterns.
Figure 12B:
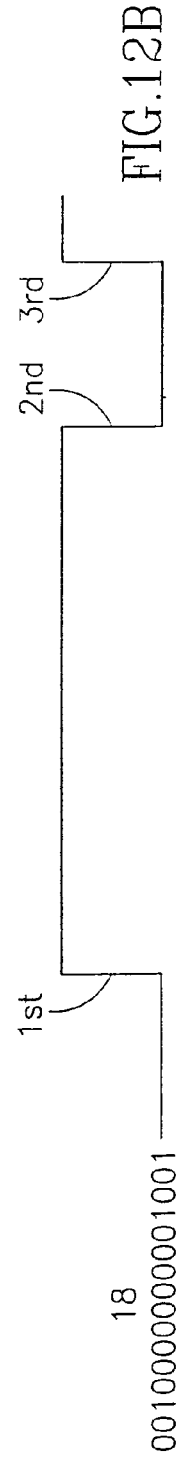
Figure 12C:
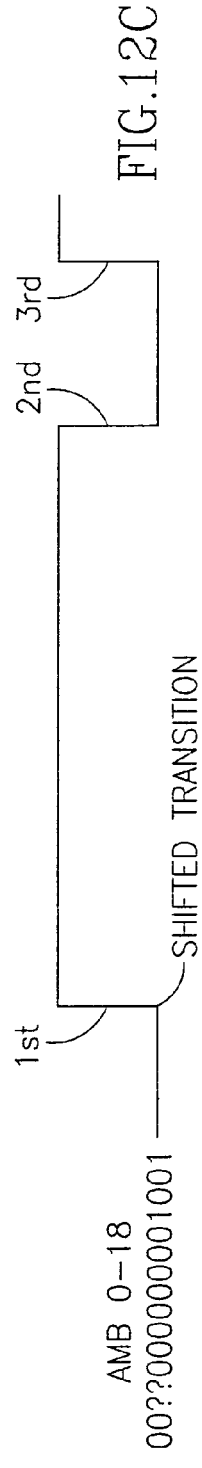
Figure 12D:
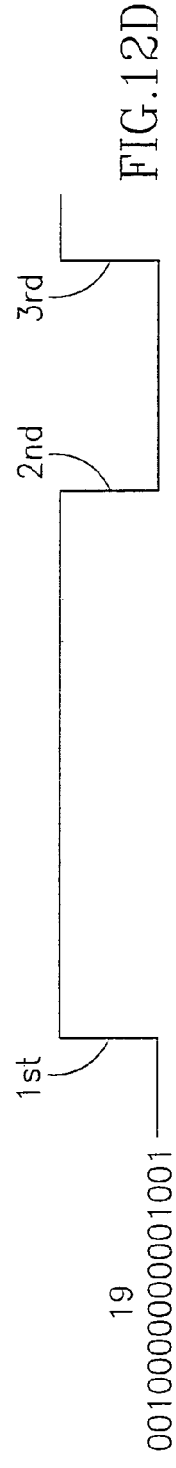
Figure 12E:
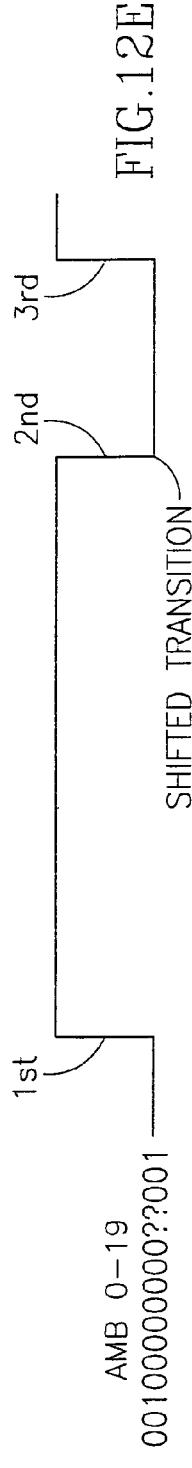

There are several different ways to make sectors unreadable which may be carried out prior to forming ECC blocks. Reference is now made to FIG. 9, which is a schematic illustration of the composition of a sector, which contains a header. error detection CRC, and 2048 bytes of data.

The EDC (error detection symbols) are calculated from a CRC (cyclic redundancy code) based on the contents of the sector. If any byte or bytes in the sector are read incorrectly, the CRC computed from the actual contents of sector does not match the CRC computed from the original contents of the sector as stored in the EDC. A DVD reader determines that the contents of a sector have been read correctly, if the CRC computed from the contents matches that stored in the EDC.

For example, suppose an ECC block has been formed in the standard manner, and all its symbols encoded in EFM+. Suppose one of the EFM+ symbols is replaced by its ambiguous representation, as discussed later, and the modified ECC block written to disc in the usual manner. When a DVD reader attempts to read the sector within the modified EFM block from the disc, the modified EFM+ symbol may decode to its original value. In this case, the EDC computed from the sector as read corresponds to the EDC stored in the sector. The sector is read correctly. If, however, the ambiguous symbol decodes to a value other than the original one, the computed EDC will not match the stored EDC. In this case, the reader will return an error condition. As the number of ambiguous encodings in a sector increases, the number of reads required to return the original contents of the sector increases as well.

The contents of the sector header, such as the ID (Identification Data), IED (ID Error Detection Code), CPR_MAI (Copyright Management Information), for example, may be altered prior to forming ECC blocks. The alteration may be made by taking the 1's complement (changing the "0" to "1" or "1" to "0") of one or more components, or by randomly generating new components, for example. The EDC may be modified to correspond to the altered components of the sector header.

Alternatively, the EDC can be altered again, by taking the 1's complement (changing the "0" to "1" or "1" to "0") of one or more components.

In a further alternative, one or more of the remaining 2048 bytes of the sector can be altered, for example by taking 1's complement, without correspondingly modifying the EDC.

In a further embodiment of the present invention, the DG-DVD may append or replace a plurality of data sectors to the original Data zone, for example 4096 data sectors. The user data portion of each appended or replaced sector may consist of 2048 bytes, for example, of binary zeroes.

The additional data sectors may not be reflected in End sector number of the Data Zone, found in byte position 9–11 of the Physical format information (Sector 0) of the Control data block. The End sector number may remain unchanged from its original value.

Thus, any disc copying scheme that consults the End sector number may not be aware of the additional data sectors, which will therefore not be copied and thus, the signature will not be validated The appended sectors, numbered 0 . . . 4095, may be divided into 2 groups in a pseudo-random manner:

Group 1—may consist of 1024 sectors that are generally unreadable;

Group 2—may consist of 3072 sectors that are generally readable.

The seed for the pseudo-random number generator generated may be a function of the sector number of the start of the appended data. The appended sectors may be made unreadable as described hereinabove with reference to FIG. 9.

Signature—Legally Non-Reproducible

In a further embodiment of the present invention, a signature is added to the DG-DVD that cannot be illegally reproduced. The signature is characterized by to being placed in sectors that generally require more than one read operation to return data successfully. This component may require a specially modified encoder for producing ambiguous symbols and selectively disabling Reed-Solomon parities, and thus is resistant to copying in home recorders and unauthorized manufacturing facilities.

This signature may be produced in place of or in addition to appending 4096 data sectors to the original Data zone, described above An exemplary method for producing a signature that cannot be reproduced illegally is now described with reference to the flow chart block diagram illustration of FIG. 1.

The method comprises partially disabling error correction (step 202) prior to EFM+ encoding and introducing ambiguous symbols into an Error Correcting Code (ECC) block (step 204) during EFM+ encoding. Then the signature is validated by measuring the length of time it takes to correctly read the 'amended' sector within the block or alternatively, by counting the number of read operations it takes to correctly read the amended sector (step 206).

Reference is now made to FIG. 2, which is a diagrammatic representation of a Error Correcting Code (ECC) Block.

Each Block contains 16 sectors, each sector containing 2064 bytes. The 2064 bytes comprise 2048 bytes of Main Data, 12 header bytes. and 4 bytes of Error Detection Code (EDC). The 12 header bytes comprise 4 identification bytes (ID), 2 error detection bytes (IED) and 6 copyright management bytes (CPR_MAI), After scrambling the Main Data in the Data Sectors, Reed-Solomon error correction coding information is added to each group of 16 Data Sectors to form an ECC block with supplementary inner-code parity (PI) and outer-code parity (PO) bytes.

After EDC calculation over the Data Sectors, scrambling data are added to the 2048 bytes of Main Data in the Data Sector. Then, The Error Correction Code is applied over 16 Data Sectors, or one ECC block (33,024 bytes).

The 2064 bytes of each sector are arranged as 12 rows× 172 bytes. Thus 16 sectors comprise a block consists of 192 rows×172 bytes, as shown. The bytes are referenced from B 0,0 (110) to B 191, 171 (112).

In addition, 16 bytes (rows) of Outer Parity (PO), referenced from B192,0 (114) to B207, 171 (116), are added to each column (that is 16 rows×172 bytes). 10 bytes (columns) of Inner Parity (PI) referenced from B0,172 (118) to B207, 181 (120) are added to each of the 208 rows (192 data+16 formed by the PO-bytes) to form a Reed-Solomon Product Code with 208 rows and 182 columns (172 data+10 formed by the PI-bytes.

The Reed-Solomon code can generally correct up to 5 byte errors of unknown location in each column, and up to 8 byte errors of unknown location in each column. If error locations are known, then up to 10 errors can be corrected in each row, and up to 16 errors can be corrected in each column.

Figure 3:
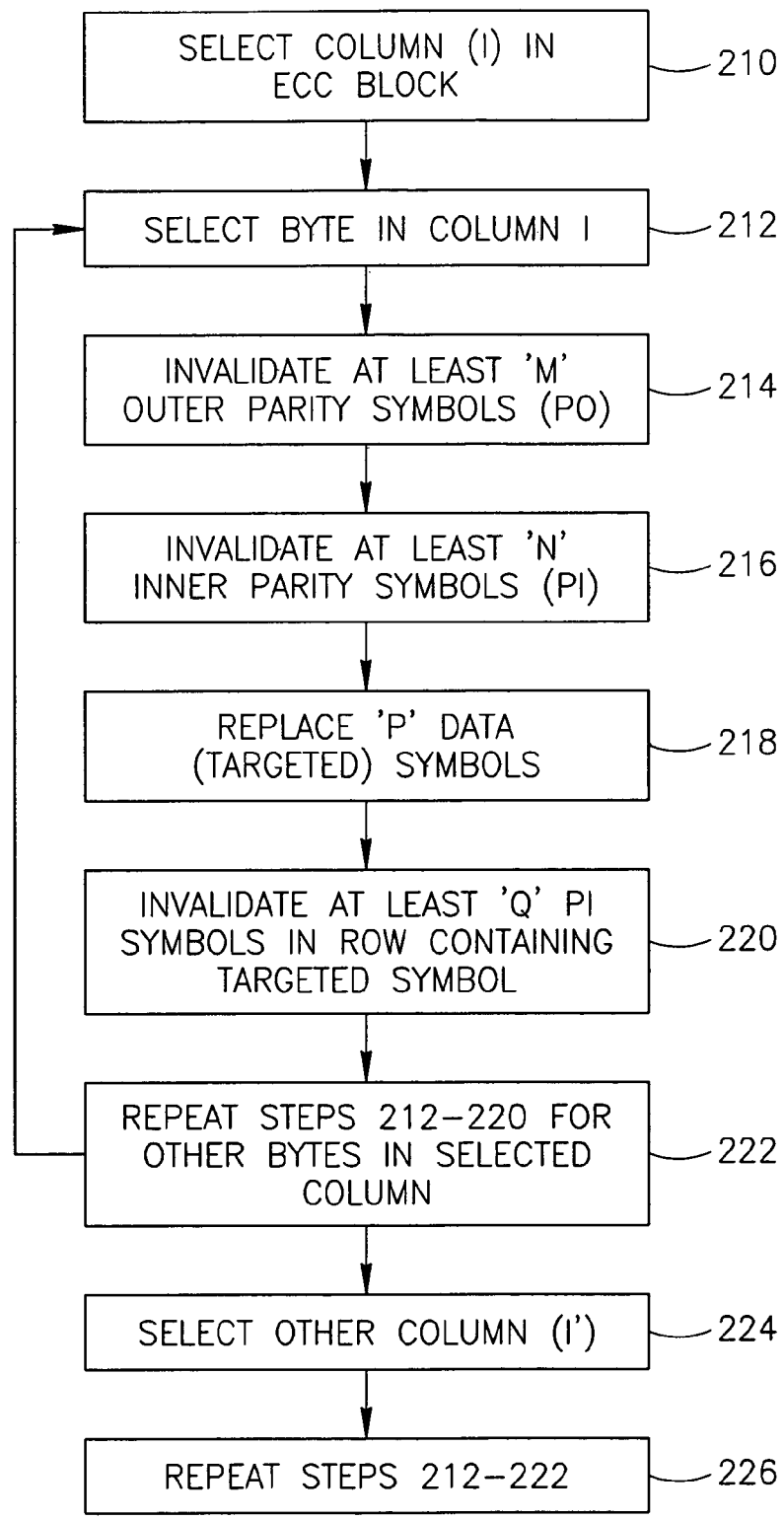
FIG. 3 is a detailed flow chart block diagram illustration of the flow chart of FIG. 1.

Reference is now also made to the flow chart illustration of FIG. 3, which illustrates the steps of introducing ambiguous symbols into an ECC block (step 202) and partially disabling error correction (step 204) FIG. 1.

In an ECC block (comprised of 16 sectors plus parity symbols), one of the columns (I) (0<=I<172) is selected (step 210). For example, column I=170. In column 170, one byte is selected (step 212), for example symbol $B_{189, 170}$ (126) which has 10-PI bytes (Rows: $B_{189, 172}$ to $B_{189, 181}$) and 16-PO bytes (Col: $B_{192, 170}$ to $B_{207, 170}$).

At least 'M' outer parity symbols (P0) of the 16 PO bytes ($B_{192, 170}$ to $B_{207, 170}$) in column 170 are invalidated (step 214), for example in an embodiment, 'M'=8, (that is half of the 16 PO bytes). Parity symbols may be invalidated by replacing each symbol by any other symbol, or by replacing each symbol by its 1's complement prior to EFM+ encoding. The invalidated PO symbols will then not be able to correct any errors in that row.

At least 'N' inner parity symbols (PI) of the 10 PI bytes in each row containing one of the above invalid outer parity symbols is then invalidated (step 216). For example in an embodiment, 'M'=8, (that is half of the 16 PO bytes). If eight PO bytes ($B_{192, 170}$ to $B_{119, 170}$) have been invalidated, then at least five of the ten PI bytes in each of rows $B_{192}$, to $B_{199}$, should be invalidated, for example, in row 192, five of the ten PI bytes referenced $B_{192, 172}$ to $B_{192, 181}$.

At least 'P' data symbols (the targeted symbols) in the column (170) are replaced by their corresponding ambiguous representation (step 218) at the time of EFM+ encoding. In an embodiment, p=4.

At least 'Q' inner parity symbols in each row (in the example—row 189) containing a targeted symbol are then invalidated (step 220). In an embodiment, 'Q'='N'=5, that is at least five of the ten PI bytes referenced $B_{189, 172}$ to $B_{189, 181}$) are replaced.

Steps 212–220 may be repeated for any other bytes within the selected column 170 (step 222).

Another column (I') (0<=I'<172) may be selected (step 224) and steps 212–222 repeated for bytes in that column (step 226).

It will be appreciated by those knowledgeable in the art that the invention is not limited by the number of bytes within a column or the number of columns.

It will also be appreciated by those knowledgeable in the art that the invention is not limited to the specific number of invalidated PO and PI symbols nor by the specific number of targeted data symbols which are replaced by their ambiguous representations, which have been used in the example described above.

The amended ECC block contains at least one ambiguous symbol, which means that when an attempt is made to read the ECC block, there is a 50% chance that the symbol will be read correctly.

DVD uses EFM+ encoding to convert 8 bit data and parity to 16 bits. An 8 bit symbol is encoded according to a Main Table and Substitute Table, each table containing 4 possible encodings, depending on encoder state.

The 8-bit bytes of each recording frame are transformed into 16-bit code words with the run length limitation (RLL) that between 2 ONEs there are at least 2 ZEROs or at most 10 ZEROs (RLL 2.10).

Tables G.1 and G.2 (of the Standard ECMA-267, $3^{rd}$ edition, April 2001) list the 16-bit Code Words into which the 8-bit coded Data bytes have to be transformed for the main Conversion and Substitution Tables, respectively. In the tables, the 8-bit bytes are identified by their decimal value.

The DVD standard defines a 4-state EFM+ encoding engine. The 16 bit code word is a function of the 8 bit data value and the current state. The next state is a function of the current state and the 16 bit code word. The encoding state engine is defined in Main Tables and Substitution Tables in the DVD standard.

The Applicant has determined, for each possible encoding (with a few exceptions), pairs of encodings that differ by 1 transition position. By shifting the transition to be between that of the pair, an ambiguous encoding is generated. Thus, when the DVD is read, the ambiguous data will be read as one of at least 2 possible values, only one of which is correct.

Tables showing ambiguous DVD pairings are shown in Appendix A. The tables of ambiguous symbols are similar to Main Tables and Substitution Tables (G.1 and G.2) in the DVD standard showing the 4-states for each 8-bit byte with the addition of two extra columns for each State, referenced 'shift' and 'alt'. Each 1-bit byte has two of the bits marked '?'-indicating that these bits are ambiguous and may be read as either a 'zero' or '1'.

The column 'shift' indicates the number of the bit which should be moved (starting from the left) and the arrow </> indicates the direction of the transition.

The column 'alt' indicates the alternative 16-bit encoding value which is equivalent to the alternative reading of the ambiguous symbol marked '?'.

Reference is now made to FIG. 12, which illustrates three data values, respective EFM+ encodings, and respective ambiguous encodings, together with their respective pit and land patterns for State 1, For example, the 8-bit byte '0' (hex value '00') in the main conversion Table G1 has a codeword '0010000000001001' (FIG. A) The next state is 'state-1'.

In the Ambiguity Table (APPENDIX A), for the 8-bit byte 'value 0', the $3^{rd}$ and $4^{th}$ bit are marked with '?' indicating that the transition to '1' may be read at either the 3rd or 4th bit position. Thus the value '0' is ambiguous and can be read in either of two possible ways. If the 16-bit encoding is read as '0010' for the first 4-bits, then the value is read as '0'—(FIG. A) (as per the value of '0'; in Table G1). Alternatively, If the 16-bit encoding is read as '0001' for the first 4-bits, then the value is read as decimal '18' (equivalent to hex '12')—( FIG. B).

In the Ambiguity Table H1, the shift is shown as 3>, instructing an encoder as per this invention to generate a transition between the 3rd and 4th bits, the shifted transition (FIG. C). Alternatively, a different combination may be used, for example as shown in FIGS. D and E, the combination of 0 and 19 may be used. In 19 middle transition.

As will be appreciated by persons knowledgable in the art, any suitable combination of symbols may be configured to produce ambiguous symbols.

An ECC block is comprised of 16 sectors plus parity symbols. Each sector contains an Error Detection Code (EDC). The EDC is a 4 byte field which contains the check bits of an EDC computed over the preceding 2060 bytes of the Data Frame.

In an alternative embodiment, the EDC can be compared with the checksum generated for the corrected sectors after the error correction has taken place and before the data is read. If the checksum is correct, then the correct values have been passed on and the DG-DVD is valid. If the checksum is not correct, then an error condition is generated.

The checksum value itself can be changed so as to be defective. That is, an illegal copy, which carries out error correction and produces a 'correct' checksum will in fact be 'incorrect' and indicative of its illegality.

Detecting/Validating the Non-Reproducible DG-DVD Signature

The Non-Reproduceable DG-DVD signature may be validated by comparing the time to read at least one unprocessed sector within the ECC block with the time to read at least one processed sector within said ECC block.

Figure 5A:
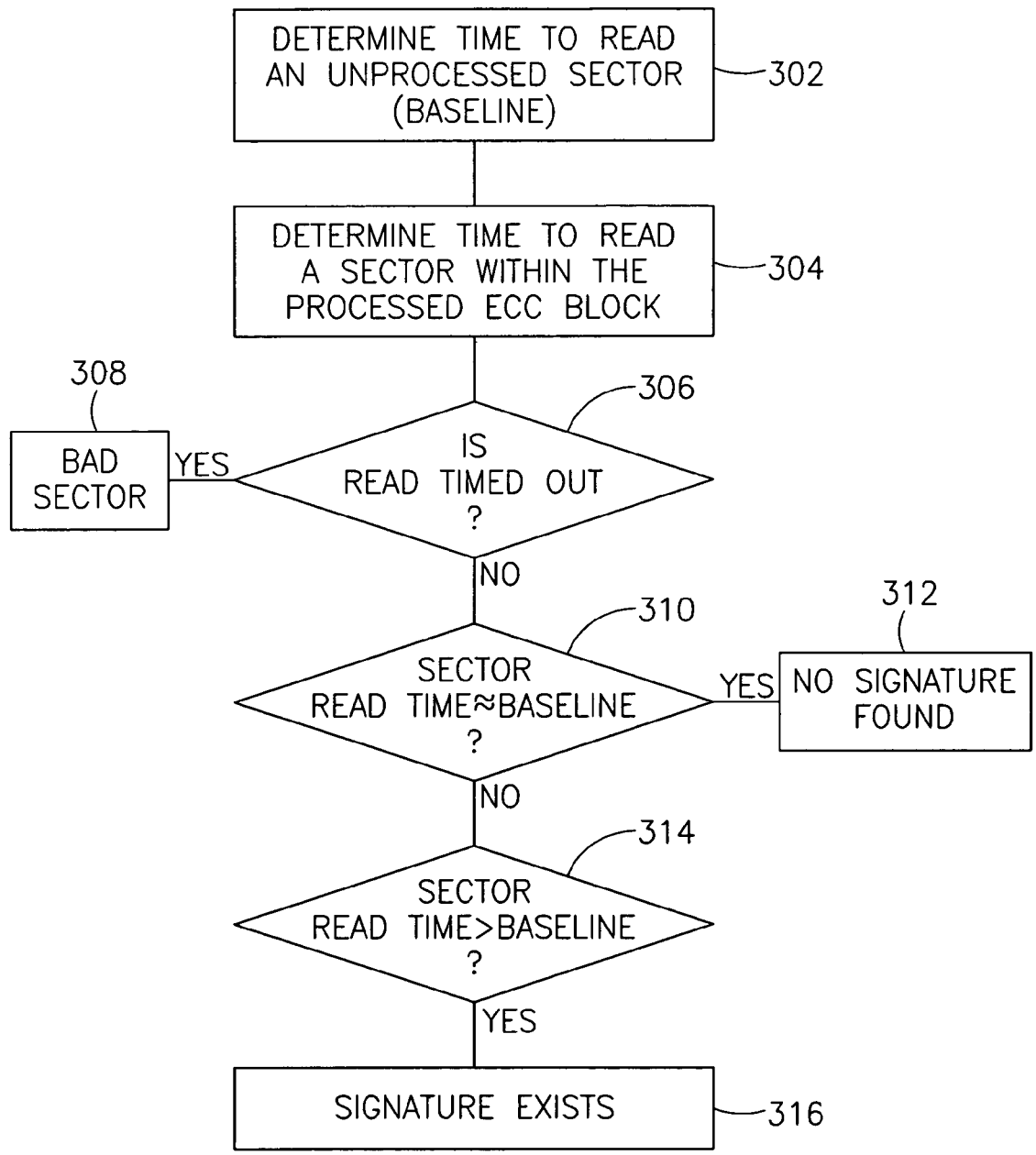
FIGS. 5A and 5B are flow chart illustrations of validating the Non-Reproduceable DVD signature produced according to FIG. 1.

Reference is now made to FIG. 5A, which is a flow chart illustration of validating the Non-Reproduceable DG-DVD signature produced as described hereinabove. An unprocessed sector in the targeted sector is read to obtain a 'baseline' read time (step 302). The time to read a sector within the processed ECC block is determined (step 304). The sector within the processed ECC block is continously read until either it is successfully read or is timedout (query box 306).

If timeout is reached, the sector is deemed to be permanently bad (308). In other words, the DG-DVD signature component is not found.

If sector is readable, a comparison is made with the baseline time(query box 310). If the time is comparable to baseline read time as above, the sector does not have the DG-DVD signature component (312).

If the signature is read in a time significantly greater than baseline read time (314), sector does have a signature component (316).

Figure 6:
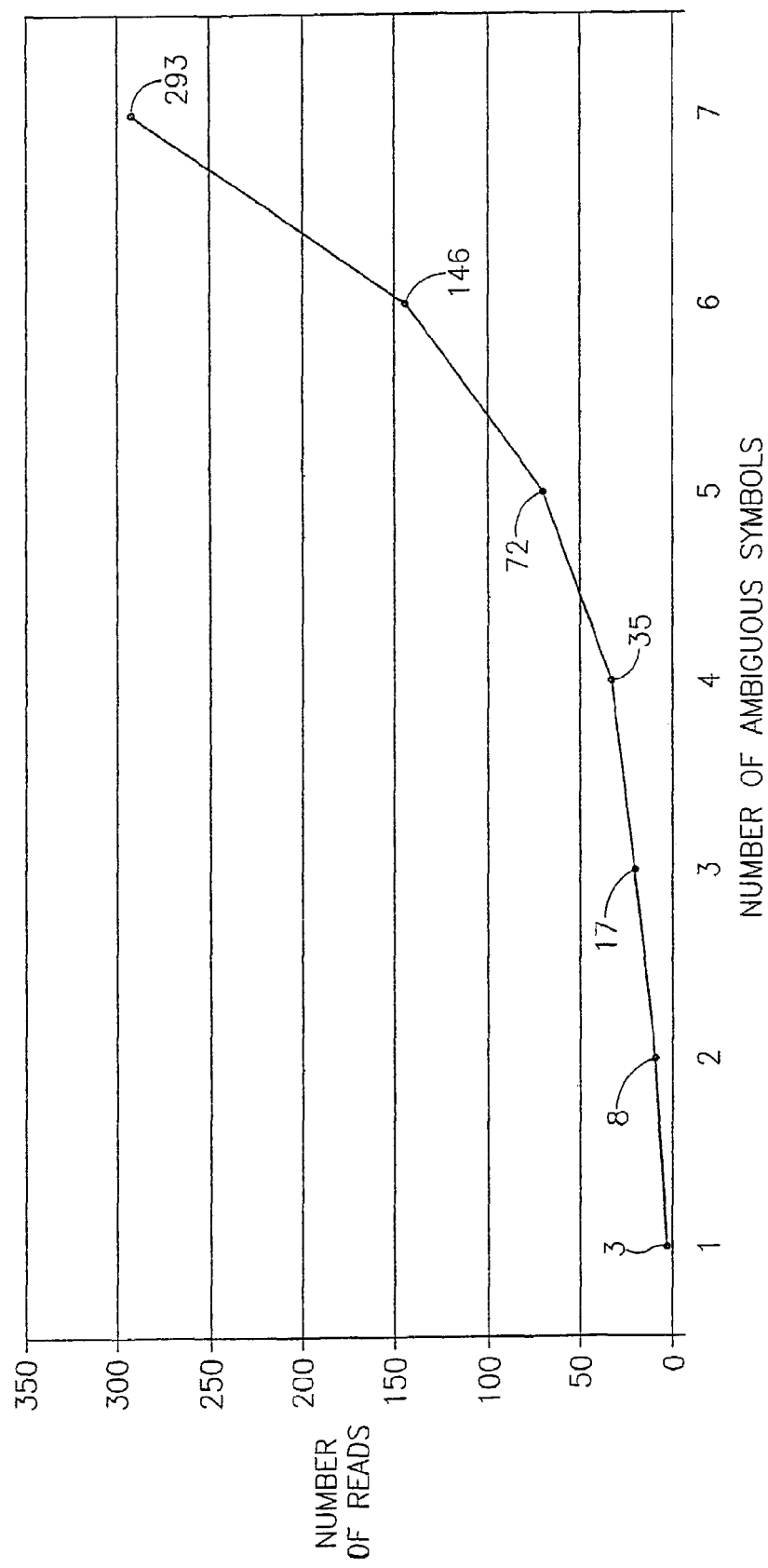
FIG. 6 is a graph illustrating the number of reads required to read a sector correctly 90% of the time, as a function of the number of ambiguous symbols in the sector.

The expected number of reads as a function of ambiguous symbols is shown in FIG. 6.

Figure 5B:
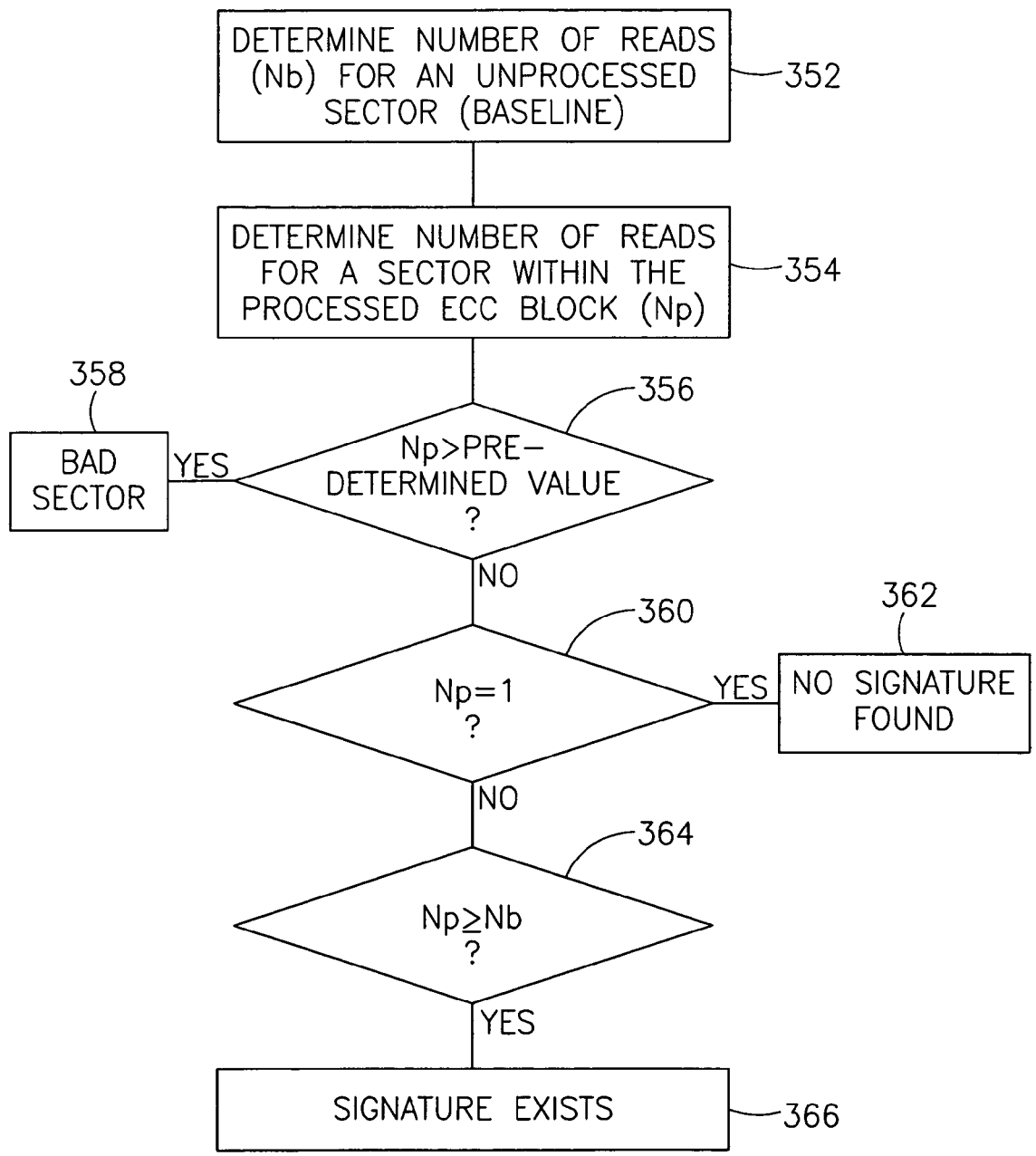

An alternative embodiment is illustated in FIG. 5B, to which reference is now made. FIG. 5B is a alternative flow chart illustration of validating the Non-Reproduceable DVD signature produced as described hereinabove, and is similar to FIG. 5A.

In the embodiment of FIG. 5B, an unprocessed sector in the targeted sector is read to obtain a 'baseline' number (Nb) for the number of times a sector needs to be read (step 352). The number of reads for a sector within the processed ECC block is then determined (step 354). The sector within the processed ECC block is continously read until either it is successfully read or exceeds a pre-determined number of reads (query box 356).

If the pre-determined number of reads is reached without a successful read, the sector is deemed to be permanently bad (358). In other words, the DVD signature component is not found.

If sector is readable, and the number of reads is one, (query box 360) the sector does not have the DVD signature component (362).

If the number of reads (Np) is greater than baseline number (Nb) (364), the sector does have a signature component (366).

Signature Validation

Validating a DG-DVD signature may consist of 4 validation tests: one passive test and 3 active tests. The criteria for a disc to be deemed a copy may be for failure to pass at least one of the tests.

The tests may be implemented using basic, low-level Mt Fuji (SFF8090) functions, known in the art. If a drive is unable to execute a given validation test, that test may be ignored. If a drive is unable to execute any of the validation tests, the disc may be deemed to be an original.

Passive Validation Test

The passive test positively detects all copies made on recordable or rewritable media. The test is called passive because it does not require any special actions at mastering time.

The DVD specification requires that a DVD disc contain information about type of disc (Book Type). Currently, the possible values of Book Type are DVD-ROM, DVD-RAM, DVD-R, DVD+RW and DVD-RW.

Therefore, the passive test may use the 'READ DVD STRUCTURE' command (p.365 of Mt Fuji Spec. (SFF8090)), Format Code 0x00 to read the Book Type. If Book Type is anything but DVD-ROM, the disc may be deemed to be an illegal copy.

Active Tests

Active tests look for the special DG-DVD modifications to the BCA and DMI made during mastering. If a modification is not detected, the disc may be deemed to be an illegal copy. The active tests may include: 'BCA Descriptor Test', the 'Disc Manufacturing Info (DMI) Test' and the 'Altered Sectors Test'.

Alternatively, instead of the 'Altered Sectors Test', the active test may include the 'Detection of the DVD Signature'.

BCA Descriptor Test

The test may use the 'READ DVD STRUCTURE' command, Format Code 0x03. If the command returns a result of Invalid Field in CDB, meaning that the BCA descriptor says that there is no BCA on the disc, then the disc may be deemed to be an illegal copy. As described hereinabove, In the DG-DVD of the present invention, the BCA descriptor is set to 0x80, whether or not BCA data is present.

Disc Manufacturing Info (DMI) Test

This test may use the 'READ DVD STRUCTURE' command, Format Code 0x04.

If the data returned does not include the bytes modified, the disc may be deemed to be an illegal copy. As described hereinabove, DG-DVD may selectively change one or more of the 0x00 to one of (0x01, 0x08, 0x10, 0x80) for example.

Altered Sectors Test

This test may use the 'READ DVD STRUCTURE' command, Format Code 0x00 to obtain the original End sector number of the Data zone.

Using the same pseudo-random generator as described above, the verification software shall regenerate Group 1 and Group 2 at runtime. Using a time and/or system dependent seed, the software shall randomly select 9 sector numbers from Group 2 and 1 sector number from Group 1.

This test then uses the 'DVD READ 12' command to attempt to read the 10 selected Group 1 and Group 2 sectors.

The disc may be deemed an illegal copy if any sector from Group 2 is unreadable, or if the sector from Group 1 is readable.

Detecting the Non-Reproducible DG-DVD Signature

As described hereinabove, The DG-DVD signature may be validated by comparing the time to read at least one unprocessed sector within the ECC block with the time to read at least one processed sector within said ECC block.

It will be appreciated by those knowledgeable in the art that the invention is not limited to the passive and active tests described above.

Figure 4:
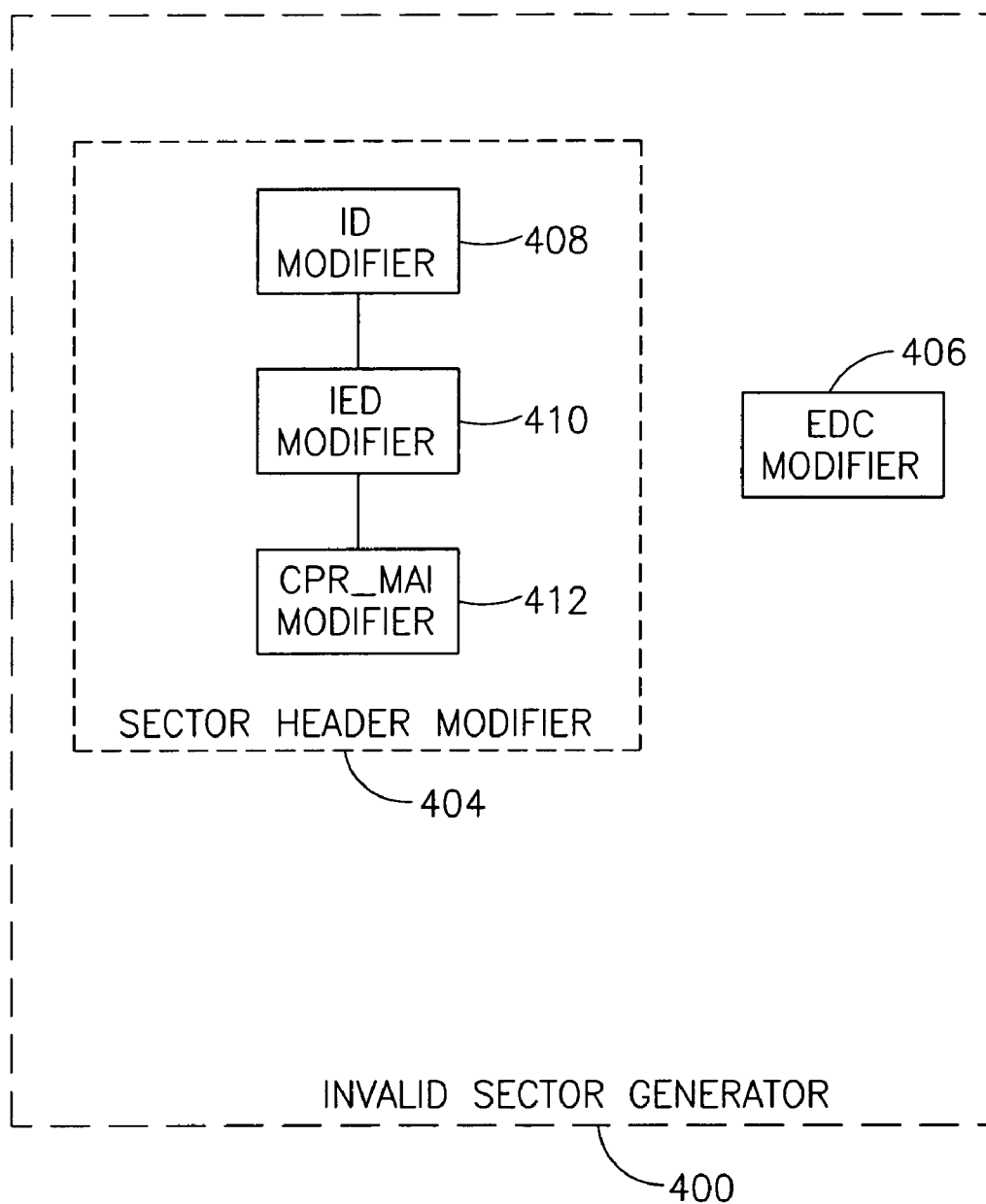
FIG. 4 is a schematic block diagram illustration of an encoder used for producing a signature, operative in accordance with an embodiment of the invention.

Reference is now made to FIG. 4, which is a schematic block diagram illustration of an encoder, generally designated 400, in accordance with an embodiment of the invention.

An EFM+ encoder according to an embodiment of the invention causes a laser beam recorder to write a pattern of pits and lands having at least one non-standard pit or land width. When a disc having such a pattern is read in a DVD reader, the decoder in the reader may interpret the pattern as one of two or more closest matching standard patterns. Ideally, the non-standard pit to land (or land to pit) transition occurs just as the decoder is determining if a transition has occurred. Therefore, instantaneous noise or jitter may affect the decoder's decision. In some instances, the decoder will just "miss" the transition, and the detected pit or land length will be stretched to the next standard size. In other instances, the decoder will just detect the transition, and the detected pit or land length will be shortened to the previous standard size.

The table of ambiguous symbols has been chosen such that a pattern with a stretched pit or land decodes to a certain 8-bit data value, and a pattern with a shortened pit or land decodes to a different 8-bit data value. Hence, reading a portion of a DVD containing such an ambiguous symbol a plurality of times will generally result in different data values being read from the ambiguous symbol. If additionally Reed-Solomon error correction has been partially disabled as described herein, in accordance with an embodiment of the invention, then the detection and decoding process in a DVD drive may not alter any of the different data values resulting from reading an ambiguous symbol. The drive generally determines if the data values of a sector are correct if the computed EDC matches the EDC stored as part of the sector data.

In accordance with an embodiment of the invention, one of the possible values decoded from an ambiguous symbol results in a valid EDC (the detected data value matches the original data value on which the stored EDC was based), whereas the other possible values decoded from the ambiguous symbol result in an invalid EDC (the detected data value does not match the original data).

Generally, a DVD drive will signal an error condition if a sector is read in which the computed EDC from the sector contents does not match the stored EDC. If the sector with a least one ambiguous symbol is read repeatedly, then within a sufficiently large number of reads each ambiguous symbol will be decoded correctly. In this case, the DVD drive will signal a success condition and return the sector data. By counting the number of reads necessary to read successfully, or equivalently, by determining the time necessary to read successfully, it is possible to infer whether or not a sector has ambiguous components.

Encoder 400 may accept an ambiguous symbol and produce a corresponding transition shifted pit/land pattern that results in an ambiguity on a disc.

Encoder 400 may comprise a invalid sector generator 402, which may comprise a sector header modifier 404 and an EDC modifier 406

The sector header modifier 404 may comprise an ID (Identification Data) modifier 408, an IED (ID Error Detection Code) modifier 410 and an CPR_MAI (Copyright Management Information) modifier 412.

Figure 13:
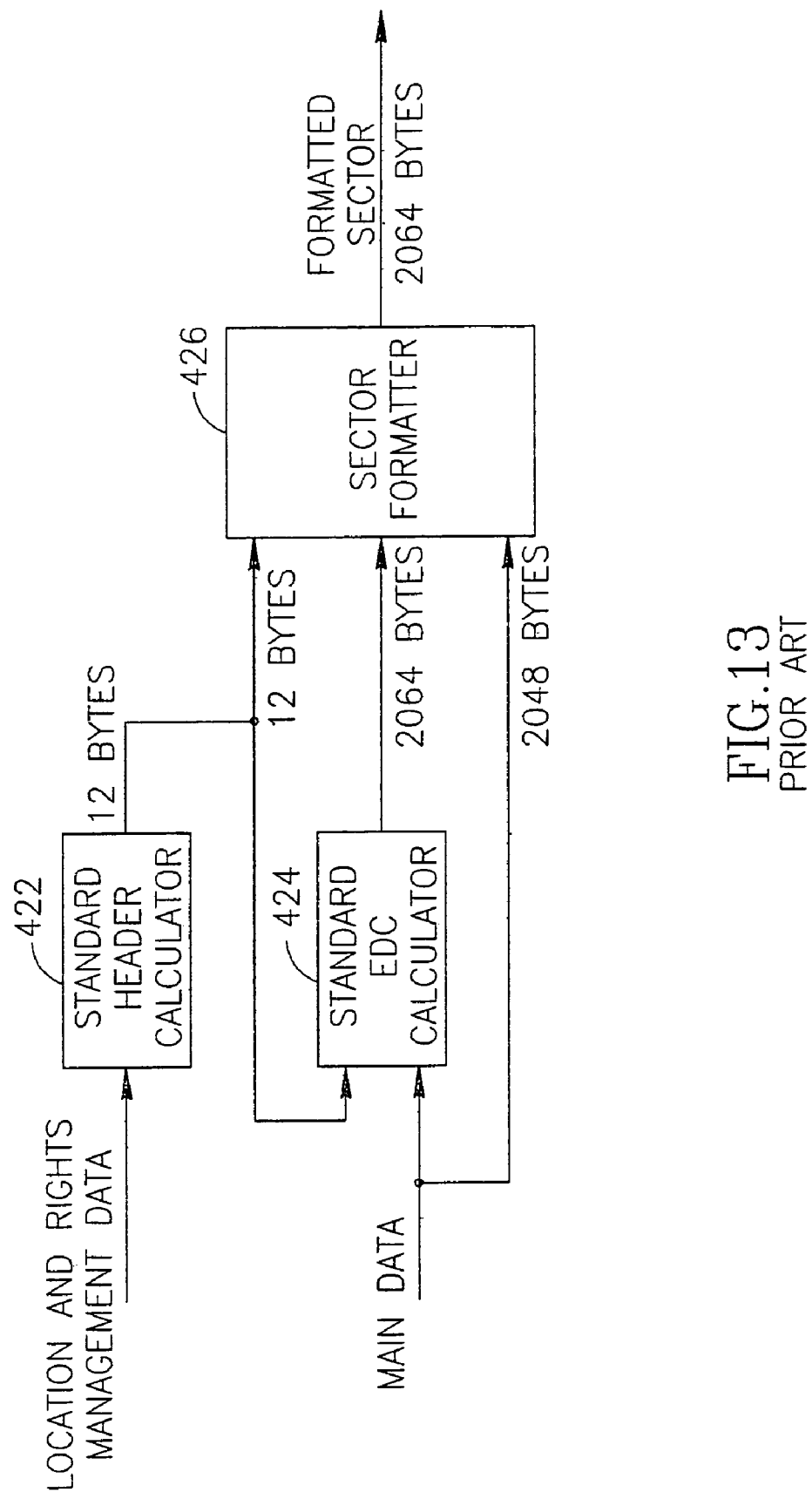
FIG. 13 is a schematic illustration of a standard sector generator.

Reference is now made to FIG. 13 which shows a standard sector generator 420 comprising a standard header calculator 422 and a standard EDC calculator 424. The standard header calculator 422 receives the location and rights management data. The EDC calculator 424 calculates the EDC based on the 2048 bytes of the main data together with 12 bytes of the header. The 2048 bytes of the main data, 12 bytes of the header and 4 bytes of EDC generated are then formatted (426) to produce the formatted sector of 2064 bytes.

Figure 14:
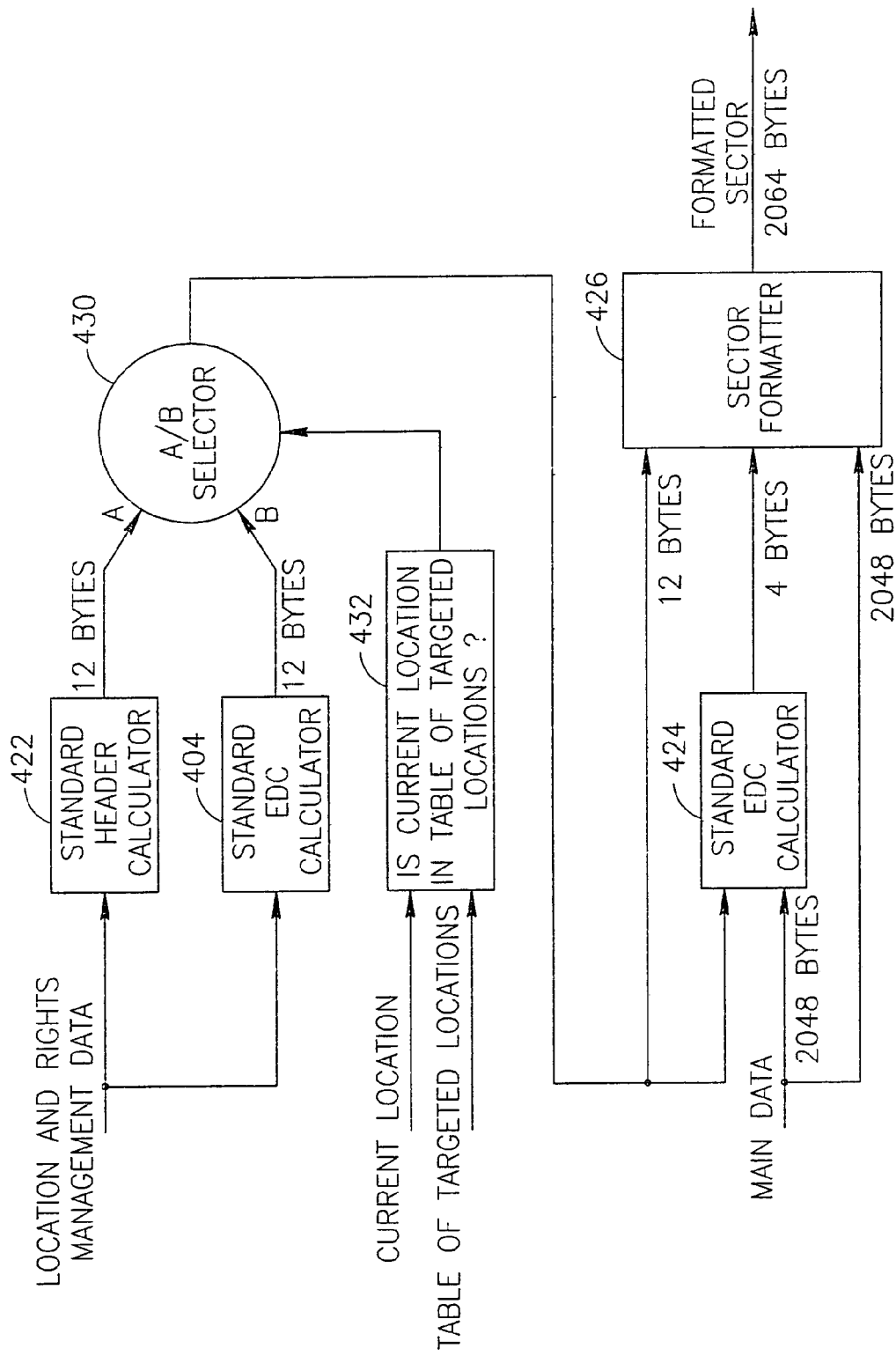
FIG. 14 is a schematic illustration of an invalid sector header modifier of an invalid sector generator.

Reference is now made to FIG. 14 which illustrates the invalid sector header modifier 404 of the invalid sector generator 402 according to an embodiment of the present invention. The invalid sector generator 402 comprises, in addition to the sector header modifier 404, the standard header calculator 422 (similar to FIG. 13A), a selector 430 and a comparator 432. The location and rights management data is received by both the invalid header modifier (calculator) 404 and the standard header calculator 422.

The comparator 432 compares the current location with a table of targeted locations and if they match, the selector 430 selects the invalid header which is then added to the 2048 bytes of the main data and 4 bytes of EDC generated to be formatted (426). If there is no match between the the current location with a table of targeted locations, then the standard header 422 is used in formatting the sector.

Figure 15:
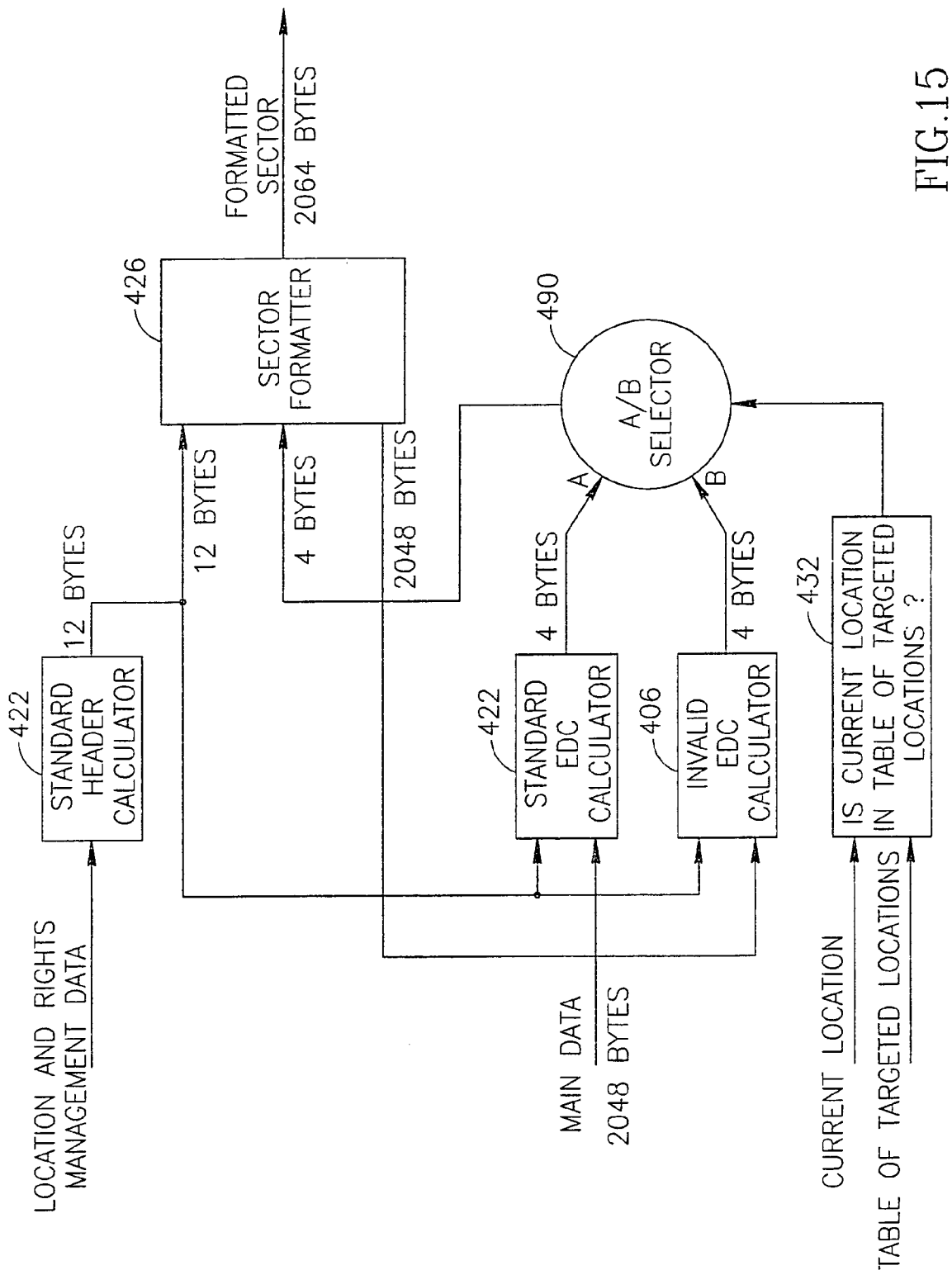
FIG. 15 is a schematic illustration of an EDC calculator of an invalid sector generator.

Reference is now made to FIG. 15 which illustrates the EDC calculator 406 of the invalid sector generator 402 according to an embodiment of the present invention. The invalid sector generator 402 comprises, in addition to the EDC calculator 406, the standard EDC calculator 424 (similar to FIG. 13A), a selector 440 and a comparator 432. The location and rights management data is received by both the invalid EDC calculator 406 and the standard EDC calculator 424 calculating two separate EDC values.

The comparator 432 compares the current location with a table of targeted locations and if they match, the selector 440 selects the invalid 4 bytes EDC which is then added to the 2048 bytes of the main data and 12 bytes of standard header to be formatted (426). If there is no match between the the current location with a table of targeted locations, then the standard EDC 424 is used in formatting the sector.

Reference is now made to FIG. 16, which shows a standard PO (Outer Priority) generator 450. For each of the 172 columns of a sector, the 192 data bytes are received by the PO generator 450 which generates 16 parity bytes. The 16 parity bytes are then combined with the 192 bytes in the column combiner 452 to generate 208 bytes for the column.

Reference is now made to FIG. 17, which illustrates a PO generator 460 of the present invention. PO generator 460 comprises the standard PO generator 450 (of FIG. 16), an invalid PO generator 462, a selector 464 and a comparator 466. For each of the 172 columns of a sector, the 192 data bytes are received by the PO generator 450 which generates 16 parity bytes. The same 192 data bytes are received by the invalid PO generator 462 generates 16 invalid PO bytes.

The comparator 466 compares the current location with a table of targeted locations and if they match, the selector 464 selects the invalid PO bytes which are then combined with the 192 data bytes in the column combiner (452). If there is no match between the the current location with a table of targeted locations, then the standard PO bytes are used in the column combiner (452).

Figure 18:
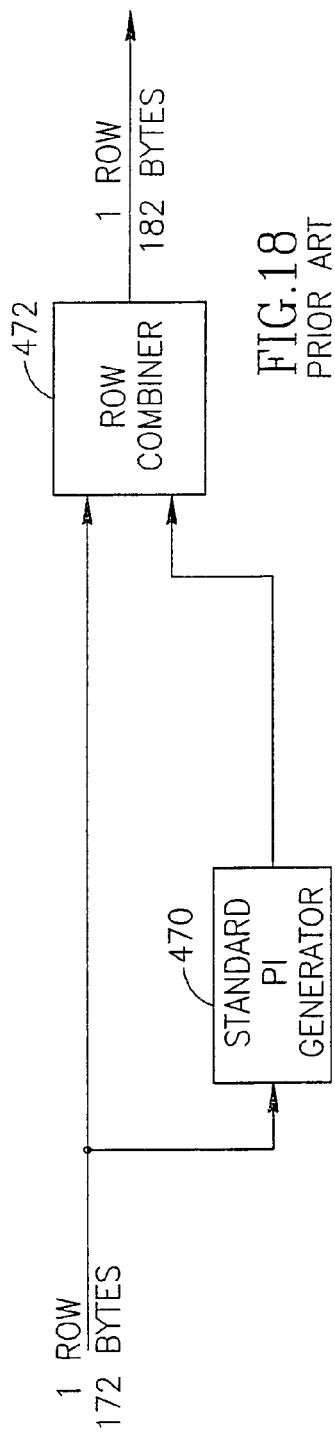
FIG. 18 is a schematic illustration of a standard PI (Inner Priority) generator.

Reference is now made to FIG. 18, which shows a standard PI (inner Priority) generator 470. For each of the 208 rows of a sector, the 172 data bytes are received by the PI generator 470 which generates 10 PI parity bytes. The 10 PI parity bytes are then combined with the 172 data bytes in the row combiner 472 to generate 182 bytes for the row.

Figure 19:
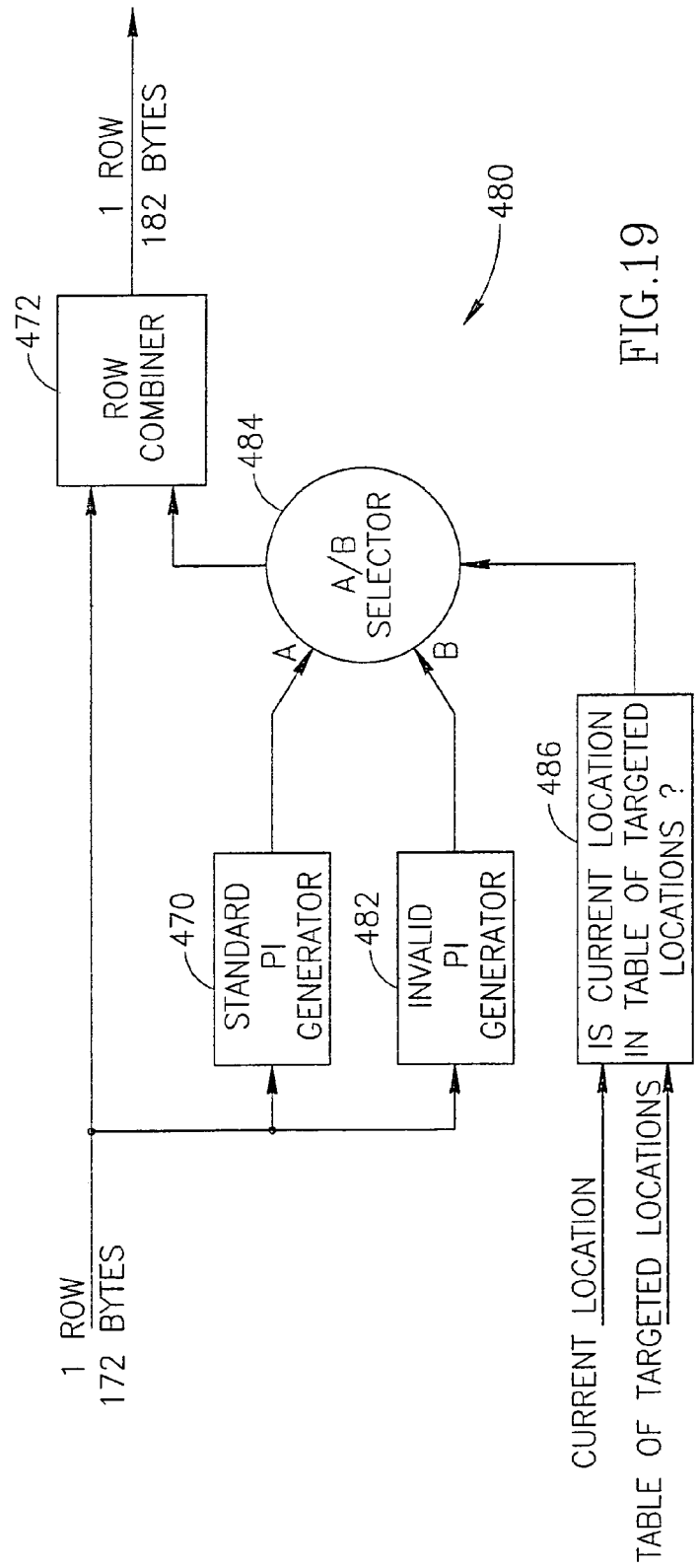
FIG. 19 is a schematic illustration of a PI (Inner Priority) generator for use in accordance with an embodiment of the invention.

Reference is now made to FIG. 19, which illustrates a PI generator 480 of the present invention. PI generator 480 comprises the standard PI generator 480 (of FIG. 16), an invalid PI generator 482, a selector 484 and a comparator 486. For each of the 208 rows of a sector, the 172 data bytes are received by the PI generator 470 which generates 10 standard parity bytes. The same 172 data bytes are received by the invalid PI generator 482 generates 10 invalid PO bytes.

The comparator 486 compares the current location with a table of targeted locations and if they match, the selector 484 selects the invalid PI bytes which are then combined with the 172 data bytes in the row combiner (472). If there is no match between the the current location with a table of targeted locations, then the standard PI bytes are used in the row combiner (472).

Figure 20:
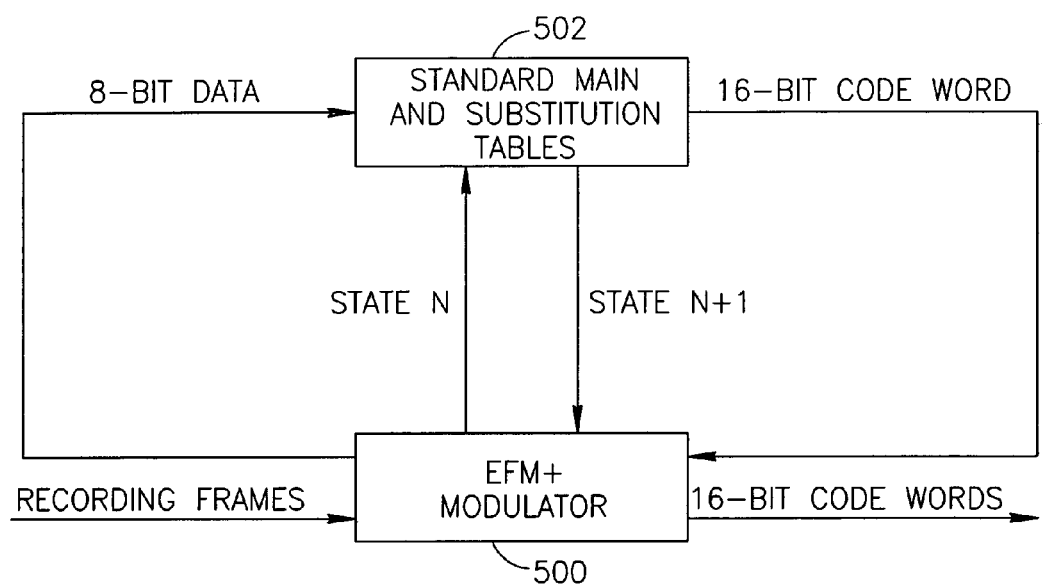
FIG. 20 is a schematic illustration of a standard EFM+ encoder.

Reference is now made to FIG. 20, which shows a standard EFM+ encoder 500, which receives the recording frame and converts each 8-bit data into 16-bit code word using the standard main and substitution tables 502 (Tables G.1 and G.2 (of the Standard ECMA-267). The tables also determine the state for the next 8-bit data conversion. EFM+ encoding is carried out prior to laser beam generation of the pits and lands of the DVD.

Figure 21:
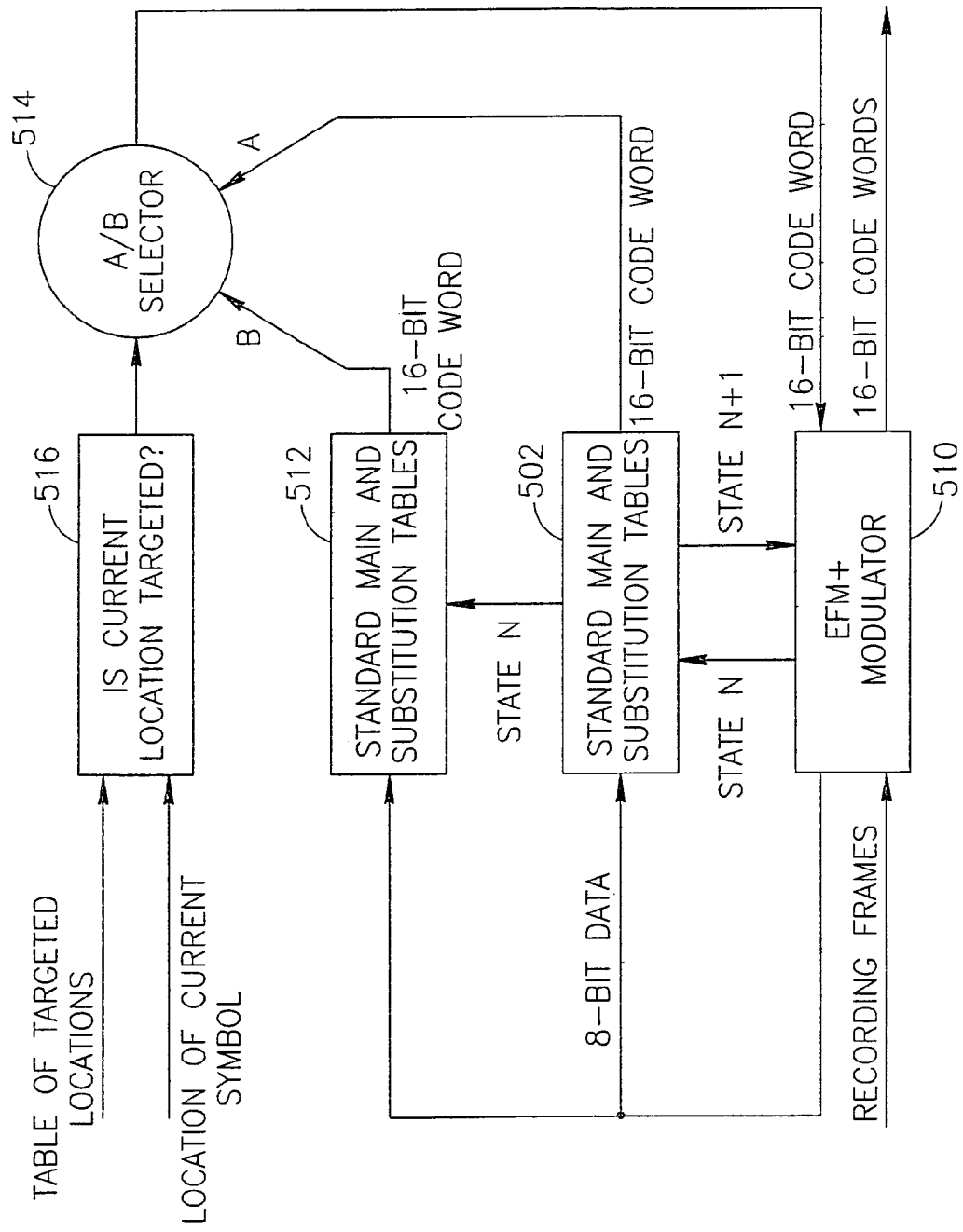
FIG. 21 is a schematic illustration of an EFM+ encoder operative in accordance with an embodiment of the present invention.

Reference is now made to FIG. 21, which shows an EFM+ encoder 510 in accordance with an embodiment of the present invention. In addition to the standard main and substitution tables 502, encoder 510 also comprises ambiguous main and substitution tables 512, a selector 514 and a comparator 516.

Each 8-bit data is converted into 16-bit code word using the standard main and substitution tables 502 and the ambiguous main and substitution tables 512.

The comparator 516 compares the current location with a table of targeted locations and if they match, the selector 514 selects the 16-bit codeword generated by the ambiguous main and substitution tables 512. If there is no match between the the current location with a table of targeted locations, then the the 16-bit codeword generated by the standard main and substitution tables 502 is selected.

Premastering a DG-DVD Disc

Exemplary requirements for premastering a DG-DVD Disc are described below. It will be appreciated by those knowledgeable in the art that the invention is not limited thereto.

Hardware and Software Requirements for DG-DVD Premastering

Hardware: Desktop PC, MMX-200 or better, 64 Mbyte RAM or more, secondary 10 GB hard disk for source files, DLT tape drive (Quantum DLT 4000 external), fast-SCSI controller.

General Description of Premaster Source Material

Data Description Protocol (DDP) is a mechanism for describing to the mastering system how the source data is to be laid out on disc. DDP 2.0 and above is the protocol that applies to DVD source data.

A customer premaster may consist of standard DDP 2 source files on DLT tape (Type IIII, IIIXT, or IV).

Before DG premastering, an executable may already have been protected by the customer, using DG/DVD Protector, and the protected application may have been written to DLT tape in DDP 2 format.

A premaster consists of a DDPID file, followed by optional text files, followed by optional Video Object Location Files, followed by a mandatory Lead-in Control Information file (generally called CONTROL.DAT), followed by a mandatory DVD Image file (generally called IMAGE. DAT).

Figure 7:
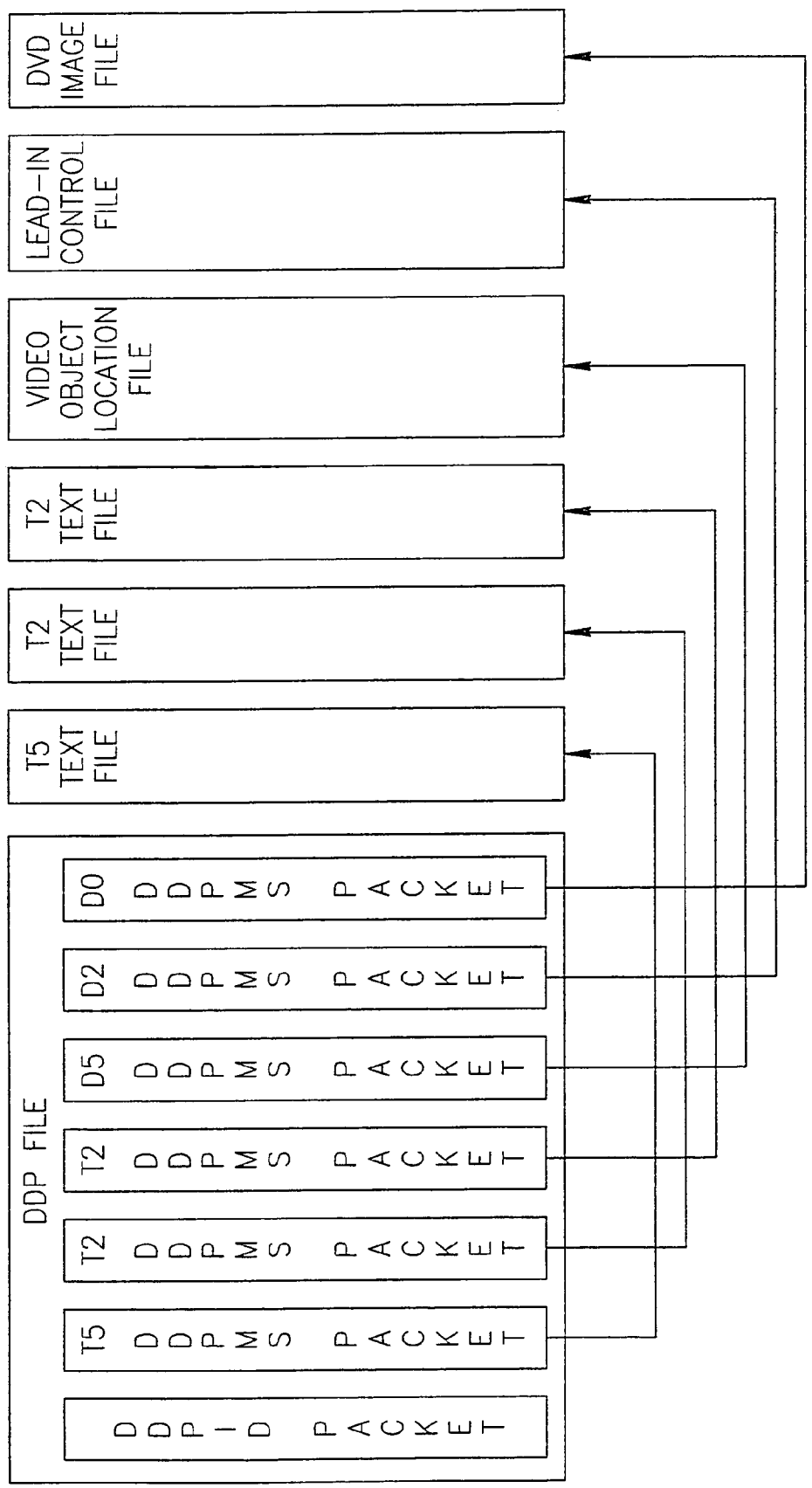
FIG. 7 is a schematic illustration of the packets in Data Description Protocol DDPID containing pointers to source files.

Packets in DDPID contain pointers to, and other information about, the source files, as shown in FIG. 7.

DG-Premastering

DG-DVD requires modifying the original DDPID and CONTROL.DAT and appending new content to IMAGE. DAT.

The original customer DLT may remain unchanged, and retained for documentation purposes, and the DG/DVD premaster may be written to a second tape to be sent for mastering.

These modifications are now specified individually.

Modifying CONTROL.DAT

The existing CONTROL.DAT may be modified as follows:

Sector 0, Byte 16 may be set to the value 0x80.

Sector 1 may be filled with the desired Disc manufacturing data as described hereinabove.

Modifying IMAGE,DAT

This file may contain altered data as described above.

Group 1 sectors and Group 2 sectors shall be generated as follows:

The original IMAGE.DAT may be converted from 2048 byte user data sectors Source Storage Mode (SSM) =0, to Complete 2054 byte data sectors, SSM=1. This is done by prepending 6 bytes of binary zero to each original sector.

The first byte of each 2054 byte sector contains Copy Protection information as per the ECMA Publications (Appendix B). If this byte is set to 0xF0, the sector is interpreted as containing secure data that is may not be readable without a correct access key (part of the CSS system). Since there is no access key on the disc, the sector may be unreadable. If the first byte is set to 0x00, the sector is interpreted as having no security, meaning that the sector may be readable.

Therefore, each Group 1 sector may have its first byte set to 0xF0, and each Group 2 sector may have its first byte set to 0x00.

Modifying DDPID

DDPID may be modified so that its DDPMS section describing IMAGE.DAT contains an SSM field whose value is 1.

DG Premastering Work Flow

Figure 8:
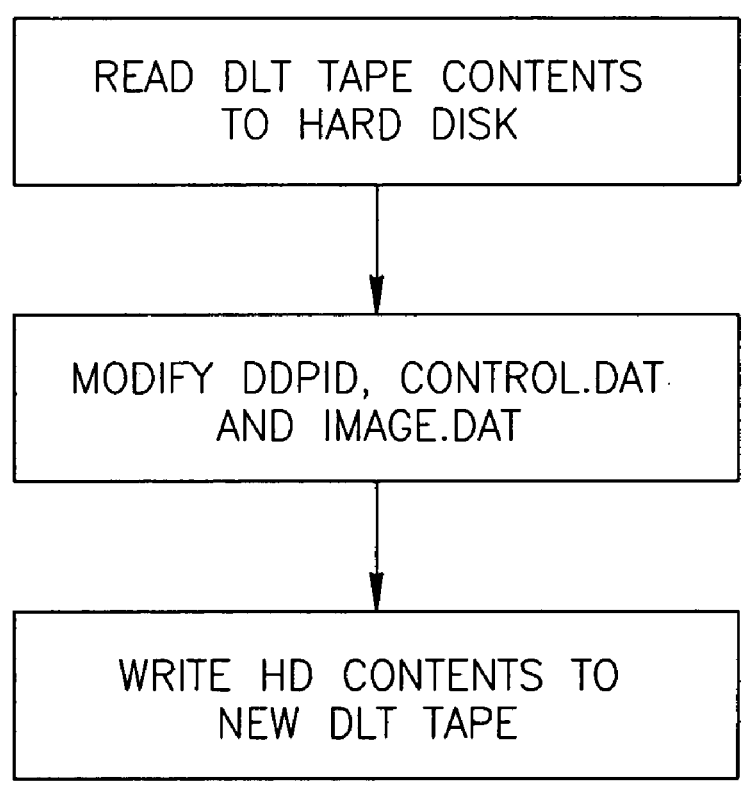
FIG. 8 is a schematic flow chart of the Premastering for the DVD of the present invention.

The DG Premastering Work Flow is illustrated in the flow chart of FIG. 8.

It will be appreciated by persons skilled in the art that the present invention is not limited to what has been particularly shown and described hereinabove. Rather the scope of the present invention is defined only by the claims, which follow:

APPENDIX A

AMBIGUITY TABLES FOR DVD

MAIN AND SUBSTITUTE TABLES

Ambiguity Tables for DVD
Main Tables

| value | | State 1 | shift | alt | State 2 | shift | alt | State 3 | shift | alt | State 4 | shift | alt |
|---|---|---|---|---|---|---|---|---|---|---|---|---|---|
| 0 | [00] | --??-------\|-- | 3> | 18 | \|-------\|--??---- | 11> | 72 | --??--------\|-- | 3> | 18 | -\|-------??---- | 11> | 72 |
| 1 | [01] | --\|---------\|--?? | 15> | 19 | \|---------\|--?? | 15> | 19 | \|----------\|--?? | 15> | 27 | \|-----------??  | 11> | 50 |
| 2 | [02] | --\|-----\|--??--- | 11> | 24 | --\|----\|--??--- | 11> | 24 | \|--------\|--?? | 15> | 27 | \|---------??  | 15> | 27 |
| 3 | [03] | --\|------\|--??-- | 13> | 26 | \|------??-\|-- | 9> | 45 | ----??----\|--- | 3> | 30 | -\|------\|--??-- | 9> | 45 |
| 4 | [04] | ---\|-----\|--??-- | 12> | 25 | --??---\|--\|--- | 3> | 29 | \|-----------??-- | 11> | 48 | -\|------\|--??-- | 11> | 48 |
| 5 | [05] | --??-----\|--\|-- | 3> | 31 | --??-----\|--\|-- | 3> | 31 | --\|--??-------- | 7> | 19 | --\|--??-------- | 7> | 19 |
| 6 | [06] | --??------\|---- | 3> | 34 | --??------\|---- | 3> | 34 | ---\|--??------- | 8> | 20 | ---\|--??------- | 8> | 20 |
| 7 | [07] | --\|---------\|--?? | 13> | 39 | -\|----------\|--?? | 15> | 92 | --??--------\|-- | 3> | 35 | \|---------\|--?? | 15> | 92 |
| 8 | [08] | --??----\|------ | 12> | 40 | --??----\|------ | 3> | 36 | \|----??------- | 9> | 37 | --\|---??------- | 9> | 37 |
| 9 | [09] | --\|-----\|--??-- | 11> | 41 | --\|-----\|--??-- | 11> | 41 | --\|--??-------- | 7> | 31 | --\|--??-------- | 7> | 31 |
| 10 | [0A] | --\|-\|---??---- | 9> | 43 | --\|-\|---??---- | 9> | 43 | ---\|--??------- | 8> | 33 | -\|--??-------- | 8> | 33 |
| 11 | [0B] | --??--\|-\|------ | 3> | 44 | --??--\|-\|------ | 3> | 44 | \|---------\|--?? | 12> | 83 | \|---------\|--?? | 12> | 83 |
| 12 | [0C] | --\|-\|---??---- | 9> | 48 | --\|-\|---??---- | 9> | 48 | \|-------\|--??-- | 12> | 49 | \|-------\|--??-- | 12> | 49 |
| 13 | [0D] | --\|-\|---??---- | 10> | 50 | --\|-\|---??---- | 10> | 50 | \|-----\|--??--- | 9> | 43 | \|-----\|--??--- | 9> | 43 |
| 14 | [0E] | --??-\|-\|------ | 3> | 51 | -??-----\|-\|-- | 2> | 6 | --??-------\|-\| | 3> | 51 | ??-------\|-\|-- | <2 | 36 |
| 15 | [0F] | --\|---\|--??--- | 11> | 53 | --\|---\|--??--- | 11> | 53 | \|-----\|--??--- | 10> | 46 | \|-----\|--??--- | 10> | 46 |
| 16 | [10] | --\|-----\|--??-- | 12> | 47 | --??---\|------- | 3> | 60 | \|--------\|--??-- | 11> | 53 | \|-------\|--??-- | 11> | 53 |
| 17 | [11] | --\|-\|-------?? | 15> | 56 | --\|-\|-------?? | 15> | 56 | --??---\|------- | <7 | 37 | ??---\|-\|------ | 1> | 35 |
| 18 | [12] | ---??------\|-\| | 4> | 57 | -??-----\|-\|-- | 2> | 4 | --??-------\|-\| | 4> | 57 | -\|------??---- | 12> | 71 |
| 19 | [13] | --\|--------??-\| | 12> | 0 | --\|--------??-\| | 3> | 62 | --\|--??------- | 8> | 39 | --\|--??------- | 8> | 39 |
| 20 | [14] | ---\|--------\|--?? | 15> | 62 | ---\|--------\|--?? | 15> | 62 | ---\|--??------- | 9> | 81 | -\|---??------- | 9> | 81 |
| 21 | [15] | ----??------\|-\| | 5> | 64 | ----??------\|-\| | 5> | 64 | \|-------\|--??-- | 12> | 55 | \|-------??---- | 12> | 55 |
| 22 | [16] | ----??--------\| | 6> | 45 | -\|--------\|--?? | <16 | 64 | ??-------\|-\|-- | 1> | 59 | ??-------\|-\|-- | 1> | 59 |
| 23 | [17] | --\|---\|--??---- | 11> | 66 | --\|---\|--??---- | 11> | 66 | \|---------\|--?? | 13> | 63 | \|---------\|--?? | 13> | 63 |
| 24 | [18] | --\|----\|---??-- | 12> | 67 | -\|----??--\|-- | 8> | 4 | \|--------\|--??-- | 13> | 73 | \|---------\|--?? | 13> | 73 |
| 25 | [19] | --\|------\|---??-- | 13> | 68 | -??--------\|-\|-- | 2> | 5 | --\|---??------- | 9> | 3 | ??------\|---?? | <2 | 34 |
| 26 | [1A] | ---\|-----\|---?? | 10> | 5 | -\|--------\|---?? | 10> | 5 | \|---------\|--?? | 15> | 58 | \|---------\|--?? | 15> | 58 |
| 27 | [1B] | ---\|---\|--??-- | 11> | 73 | ---\|---\|--??-- | 11> | 73 | --\|-------??-- | <12 | 58 | ??-------\|-\|-- | 12> | 92 |
| 28 | [1C] | --??--------\|-- | 3> | 72 | -??-------\|-\|-- | 2> | 8 | --??------\|--?? | 3> | 72 | \|---------\|--?? | 12> | 80 |
| 29 | [1D] | ---\|----\|--??-- | 12> | 70 | ---\|---\|--??-- | 4> | 76 | --\|-\|-------?? | 15> | 9 | \|-\|-------?? | 15> | 9 |
| 30 | [1E] | ---\|-----\|--??-- | 13> | 74 | ---\|-----\|--??-- | 11> | 85 | -----\|--??---- | 4> | 77 | \|------\|--??-- | 11> | 85 |
| 31 | [1F] | --??----\|--\|-- | 4> | 78 | ---\|-----\|--??-- | 4> | 78 | -\|--\|--??---- | 8> | 89 | -\|--\|--??---- | 8> | 89 |
| 32 | [20] | --??----------\| | 4> | 79 | --??----------\| | 4> | 79 | ---\|----\|--??-- | 15> | 10 | -\|--\|--??---- | 15> | 10 |
| 33 | [21] | --??---------\|-- | 4> | 80 | --??---------\|-- | 4> | 80 | ---\|--??------- | 9> | 94 | ---\|--??------- | 9> | 94 |
| 34 | [22] | ---??---------\| | 4> | 81 | ---??---------\| | 4> | 81 | -------??---\|-- | <11 | 63 | ??-------\|--\|-- | 1> | 25 |
| 35 | [23] | ---\|------\|---?? | 13> | 86 | -??----\|-\|---- | 2> | 11 | ---??----\|-\|-- | 4> | 82 | ??-------\|--\|-- | <2 | 17 |
| 36 | [24] | --\|----\|--??---- | 12> | 87 | --\|----\|--??---- | 4> | 83 | \|--------\|--?? | <11 | 73 | ??-------\|--\|-- | 1> | 14 |
| 37 | [25] | --\|----\|--??---- | 11> | 88 | --\|----\|--??---- | 11> | 88 | ------??------- | 6> | 17 | -\|---??------- | 6> | 17 |
| 38 | [26] | --??---\|------- | 3> | 85 | -\|--\|--??----\| | 8> | 96 | --??--------\|-- | 3> | 85 | -\|---\|--??---- | 8> | 96 |
| 39 | [27] | --\|--------??-\|-- | 10> | 6 | -\|--------??-\|-- | 10> | 6 | -\|----??------ | 9> | 145 | -\|----??------ | 9> | 145 |

Ambiguity Tables for DVD

Main Tables

| value | | State 1 | shift | alt | State 2 | shift | alt | State 3 | shift | alt | State 4 | shift | alt |
|---|---|---|---|---|---|---|---|---|---|---|---|---|---|
| 40 | [28] | --\|-----\|---??-- | 13> | 91 | -\|---\|--??----- | 9> | 118 | --\|-----??--\|--- | 9> | 7 | -\|---\|--??----\| | 9> | 118 |
| 41 | [29] | --\|----\|---??--- | 12> | 92 | --\|----??-\|---- | 8> | 8 | \|----\|--\|-----?? | 15> | 13 | \|----\|-\|------?? | 15> | 13 |
| 42 | [2A] | --\|---\|---??---- | 11> | 93 | --\|---\|---??---- | 11> | 93 | \|------\|---??-- | 11> | 66 | \|-----\|---??--- | 11> | 66 |
| 43 | [2B] | --\|--??--\|------ | 6> | 11 | --\|--??--\|------ | 6> | 11 | ----\|---??---- | 10> | 102 | \|----\|---??---- | 10> | 102 |
| 44 | [2C] | --??--\|--\|------ | <4 | 11 | --??--\|--\|------ | <4 | 11 | \|------\|---??--\| | 11> | 76 | \|-----\|---??--\| | 11> | 76 |
| 45 | [2D] | ------??------\| | 7> | 96 | -\|---??-\|------ | 6> | 35 | \|-----\|--\|----?? | 15> | 15 | -\|---??-\|------ | 6> | 35 |
| 46 | [2E] | --\|-\|--\|------?? | 15> | 12 | --\|---\|---??---- | 15> | 12 | \|------\|---??--\| | 11> | 105 | \|------\|---??--- | 11> | 105 |
| 47 | [2F] | --\|-----??--\|-- | 9> | 14 | -\|----\|--??---- | 10> | 125 | --\|-----??--\|--\| | 9> | 14 | -\|----\|--??----\| | 10> | 125 |
| 48 | [30] | --\|--\|---??---- | 10> | 100 | --\|--\|---??---- | 10> | 100 | \|------\|---??-- | 12> | 68 | \|------\|---??--- | 12> | 68 |
| 49 | [31] | --\|---\|--\|----?? | 15> | 13 | --\|---\|--\|----?? | 15> | 13 | -\|-----\|---??-- | 13> | 69 | -\|------\|---??-- | 13> | 69 |
| 50 | [32] | --\|---\|---??--- | 11> | 103 | --\|----\|---??-- | 11> | 103 | \|------\|---??-- | 12> | 78 | \|------\|---??-- | 12> | 78 |
| 51 | [33] | ---??----\|--\|-- | 4> | 118 | -\|----\|---??--- | 11> | 129 | --??---\|--\|--\| | 4> | 118 | -\|-----\|---??--\| | 11> | 129 |
| 52 | [34] | ----\|--\|----?? | 15> | 15 | -\|----\|--\|---?? | 15> | 15 | \|-----\|-\|---?? | 15> | 16 | \|-----\|-\|---?? | 15> | 16 |
| 53 | [35] | --\|----\|---??-- | 12> | 106 | ----??---\|--\|- | 8> | 16 | \|------\|---??--\| | 12> | 108 | \|------\|---??--\| | 12> | 108 |
| 54 | [36] | --\|------\|--?? | 15> | 16 | ------\|-\|---?? | 15> | 16 | \|------\|--\|-?? | 15> | 21 | \|-------\|--\|-?? | 15> | 21 |
| 55 | [37] | --\|-------??--- | 15> | 107 | --\|------\|---?? | 15> | 107 | \|-------??--\|-- | 9> | 22 | \|------??--\|-- | 9> | 22 |
| 56 | [38] | --\|-------??--\| | 11> | 19 | --\|-------??--\| | 11> | 19 | \|---------??-- | 15> | 110 | \|---------??-- | 15> | 110 |
| 57 | [39] | ----??-----\|-- | 5> | 121 | -??-----\|--\|-- | 2> | 16 | ---??------\|-- | 5> | 121 | -\|------\|--??-- | 12> | 111 |
| 58 | [3A] | --\|-\|--??---- | 10> | 109 | ----\|--\|---??-- | 10> | 109 | \|-----\|---??-- | 11> | 27 | \|------\|--??-- | 11> | 27 |
| 59 | [3B] | ---\|---\|--??-- | 11> | 111 | ---\|---\|--??-- | 11> | 111 | -??------\|--\|- | 2> | 14 | ??-------\|--\|- | <2 | 22 |
| 60 | [3C] | ---\|-----\|--?? | 4> | 117 | ---??-----\|-- | 4> | 117 | --\|-\|-------?? | 15> | 115 | \|--\|----??-- | 15> | 115 |
| 61 | [3D] | ---\|--------?? | 15> | 115 | ---\|--------?? | 15> | 115 | --\|--??----\|- | 7> | 117 | \|--??----\|- | 7> | 117 |
| 62 | [3E] | ----\|-----??-- | 12> | 18 | --??----\|-- | 4> | 120 | \|----\|-------?? | 15> | 31 | \|--\|--------?? | 15> | 31 |
| 63 | [3F] | ---\|---\|---?? | 15> | 120 | ----\|-----?? | 15> | 120 | \|-------??--\|- | 10> | 34 | \|------??--\|-- | 10> | 34 |
| 64 | [40] | -----\|------?? | 15> | 22 | ------\|------?? | 15> | 22 | -??------\|--\|- | 2> | 3 | -\|------\|--??-- | 13> | 77 |
| 65 | [41] | --\|--\|----??-- | 11> | 124 | --\|--\|----??-- | 11> | 124 | \|-----\|---??-- | 11> | 124 | \|-----\|---??-- | 11> | 124 |
| 66 | [42] | --\|---\|---??-- | 12> | 125 | --\|---??---\|--- | 7> | 24 | \|-----\|---??-- | 12> | 128 | \|-----\|---??-- | 12> | 128 |
| 67 | [43] | --\|--\|---??-- | 13> | 130 | -\|------\|---?? | 8> | 157 | \|-------\|---?? | 8> | 25 | -\|------\|---?? | 15> | 157 |
| 68 | [44] | --\|------??--\|- | 9> | 26 | \|------??--\|- | 9> | 26 | \|------\|---??-- | 13> | 141 | \|------\|---??-- | 13> | 141 |
| 69 | [45] | --\|------??--\|- | 12> | 28 | --??--------\|- | 3> | 135 | \|-------??---\|- | 9> | 63 | \|-------??---\|- | 9> | 63 |
| 70 | [46] | ---\|----\|-??-- | 13> | 134 | -\|------??---- | 11> | 106 | --\|----??---- | 9> | 30 | -\|-----\|--??-- | 11> | 106 |
| 71 | [47] | --\|-\|----??-- | 13> | 132 | -\|-\|---??---- | 11> | 132 | \|------??---- | 9> | 64 | \|------\|---??-- | 13> | 144 |
| 72 | [48] | ---\|--------??-- | 13> | 32 | -\|-----??--\|--- | 8> | 18 | ---??--\|-----\|- | 4> | 133 | -\|-----\|---??-- | 12> | 154 |
| 73 | [49] | --\|---\|---??-- | 12> | 127 | ----\|---??--\|---- | 8> | 29 | \|--------??--\| | 10> | 36 | \|--------??--\| | 10> | 36 |
| 74 | [4A] | ---\|-----??--\|- | 10> | 31 | --\|------??--\|- | 10> | 31 | -??--------\|-- | 2> | 7 | -\|------\|--??-- | 13> | 82 |
| 75 | [4B] | ---\|------??-- | 11> | 136 | -----\|-\|--??-- | 11> | 136 | \|----\|----??-- | 11> | 136 | \|-----\|---??-- | 11> | 136 |
| 76 | [4C] | ---\|----\|--??-- | 12> | 129 | -----??--\|--\|- | 5> | 139 | \|-------??--- | 12> | 139 | \|-------??--- | 12> | 139 |
| 77 | [4D] | --\|------\|--?? | 13> | 137 | -\|-------??--\|- | 10> | 25 | --??---\|--\|- | 5> | 138 | -\|-------??--\|- | 10> | 25 |
| 78 | [4E] | ---??------\|-- | 5> | 140 | ----??-----\|-- | 5> | 140 | \|-------\|---?? | 13> | 143 | \|-------\|---?? | 13> | 143 |
| 79 | [4F] | ----??------\|-- | 5> | 141 | ----??-------\|- | 5> | 141 | \|-------??---\|- | 9> | 73 | \|-------??---\|- | 9> | 73 |

Ambiguity Tables for DVD
Main Tables

| value | | State 1 | shift | alt | State 2 | shift | alt | State 3 | shift | alt | State 4 | shift | alt |
|---|---|---|---|---|---|---|---|---|---|---|---|---|---|
| 80 | [50] | ----??------\|-- | 5> | 142 | ----??------\|-- | 5> | 142 | -\|------??-\|--- | 9> | 74 | -\|------\|---??-- | 13> | 148 |
| 81 | [51] | ----??----\|--\|-- | 5> | 143 | ----??----\|--\|-- | 5> | 143 | \|---??---\|------ | 5> | 37 | \|---??---\|------ | 5> | 37 |
| 82 | [52] | ----\|----\|--??-- | 13> | 147 | -\|------??--\|-- | 10> | 14 | ----??---\|--\|--- | 5> | 144 | -\|------??--\|-- | 10> | 14 |
| 83 | [53] | ----\|---\|--??--- | 12> | 148 | ----??---\|-\|---- | 5> | 145 | \|-------\|---??-- | 13> | 79 | \|-------\|---??-- | 13> | 79 |
| 84 | [54] | ----\|--\|--??---- | 11> | 149 | ----\|--\|--??---- | 11> | 149 | \|--\|--\|--??-- | 13> | 159 | \|--\|--\|--??-- | 13> | 159 |
| 85 | [55] | ---\|--------??--- | 13> | 33 | -\|-------??--\|---- | 8> | 28 | ---??--------\|--- | 4> | 146 | -\|------\|---??--- | 12> | 150 |
| 86 | [56] | ---\|------??--\|-- | 10> | 34 | ---\|------??--\|-- | 10> | 34 | \|--\|---??--\|--\|-- | 7> | 165 | \|--\|-\|-??--\|--\|-- | 7> | 165 |
| 87 | [57] | ---\|-----\|---??-- | 13> | 151 | -\|-----\|---??---- | 11> | 152 | ---\|----??--\|--- | 9> | 35 | -\|-----\|---??---- | 11> | 152 |
| 88 | [58] | ---\|---\|---??-- | 12> | 152 | ---\|---??-\|---- | 8> | 36 | \|-\|--\|--\|--??-- | 13> | 168 | \|-\|--\|--\|--??-- | 13> | 168 |
| 89 | [59] | ---\|--\|---??---- | 11> | 153 | ---\|--\|---??---- | 11> | 153 | \|--\|----??----\|- | 9> | 153 | \|--\|----??----\|- | 9> | 153 |
| 90 | [5A] | --\|--------??--- | 12> | 38 | --??--------\|---- | 3> | 150 | \|---\|--\|----??-- | 15> | 161 | ??--\|--\|----\|-\|- | 1> | 164 |
| 91 | [5B] | --\|-----??--\|-- | 9> | 39 | --\|\|------??--\|-- | 9> | 39 | \|---\|-??---\|--\|- | 8> | 163 | ??--\|--\|--\|-\|-\|- | 1> | 180 |
| 92 | [5C] | --\|-----\|---??-- | 13> | 155 | -??---------\|---\| | 2> | 19 | \|----\|----??--- | 8> | 40 | ??--\|--------\|--- | <2 | 27 |
| 93 | [5D] | --\|----\|---??--- | 12> | 157 | --\|---??---\|---- | 7> | 41 | \|---\|---\|-----?? | 15> | 33 | \|---\|---\|-----?? | 15> | 33 |
| 94 | [5E] | --\|---\|---??---- | 11> | 159 | --\|--\|---??---- | 11> | 159 | \|---\|----??----\| | 10> | 169 | \|---\|----??----\| | 10> | 169 |
| 95 | [5F] | --\|---\|-------?? | 15> | 45 | -\|--\|--\|------?? | 15> | 38 | \|----\|--\|-----?? | 15> | 170 | -\|--\|--\|------?? | 15> | 38 |
| 96 | [60] | --------??------ | 8> | 164 | -\|---\|---??----\| | 9> | 188 | \|-----\|--??--\|-- | 9> | 172 | -\|-\|----??------\| | 9> | 188 |
| 97 | [61] | --\|---??--\|--- | 11> | 167 | \|\|---\|---??--\|-- | 9> | 191 | --\|---??--\|--- | 9> | 167 | \|\|---\|---??--\|-- | 9> | 191 |
| 98 | [62] | --\|--\|--\|--?? | 15> | 165 | --\|--\|-\|--\|--?? | 15> | 165 | --\|--??-----\|-- | 7> | 166 | --\|--??-----\|-- | 7> | 166 |
| 99 | [63] | --\|--\|---\|----?? | 15> | 48 | --\|--\|---\|----?? | 15> | 48 | \|--\|---??--\|--\|- | 7> | 155 | \|--\|---??--\|--\|- | 7> | 155 |
| 100 | [64] | --\|--\|---??--- | 11> | 168 | --\|--\|---??--- | 11> | 168 | \|-----\|---\|---?? | 15> | 43 | \|-----\|---\|---?? | 15> | 43 |
| 101 | [65] | --??--\|---\|--\|-- | 3> | 177 | -\|---\|---\|-----?? | 15> | 40 | --??-\|--\|--\|-- | 3> | 177 | -\|---\|---\|-----?? | 15> | 40 |
| 102 | [66] | --\|---\|----\|---?? | 15> | 50 | --\|----\|-\|---?? | 15> | 50 | \|----\|------??--- | 11> | 174 | \|----\|------??--- | 11> | 174 |
| 103 | [67] | --\|---\|----??-- | 12> | 171 | --\|---??---\|---- | 7> | 53 | ??-----\|--\|--\|-- | 1> | 183 | ??-----\|--\|--\|-- | 1> | 183 |
| 104 | [68] | --\|-----\|------?? | 15> | 53 | --\|------\|----?? | 15> | 53 | \|-----\|---\|---?? | 15> | 46 | \|-----\|---\|---?? | 15> | 46 |
| 105 | [69] | --\|------\|-----?? | 15> | 172 | --\|------\|-----?? | 15> | 172 | \|-----\|----??--\| | 12> | 176 | \|-----\|----??--\| | 12> | 176 |
| 106 | [6A] | --\|----??---\|-- | 8> | 47 | -\|----??---\|---- | 7> | 72 | --\|-----??---\|-- | 8> | 47 | -\|-----\|----??--- | 12> | 199 |
| 107 | [6B] | --\|-------??--\|- | 10> | 56 | ---\|-------??----- | 10> | 56 | \|------\|----\|---?? | 15> | 53 | \|------\|----\|---?? | 15> | 53 |
| 108 | [6C] | ---\|--\|--\|----?? | 15> | 58 | ---\|--\|-\|----?? | 15> | 58 | \|-------??--\|-- | 8> | 55 | \|-------??--\|-- | 8> | 55 |
| 109 | [6D] | ---\|-----\|--??-- | 11> | 174 | ---\|-----\|--??-- | 11> | 174 | \|-------\|----??-- | 15> | 179 | \|-------\|----??-- | 15> | 179 |
| 110 | [6E] | ---\|---\|--\|---?? | 15> | 59 | ---\|--\|-\|---?? | 15> | 59 | \|--------??---- | 10> | 58 | \|--------??---- | 10> | 58 |
| 111 | [6F] | ---\|---\|---??--\| | 12> | 181 | ---\|---??--\|---\| | 8> | 60 | -\|-------??--\|-- | 9> | 59 | -\|-------??--\|-- | 9> | 59 |
| 112 | [70] | ---\|----\|-\|---?? | 15> | 60 | ---\|----\|-\|---?? | 15> | 60 | ✗ | ✗ | ✗ | ✗ | ✗ | ✗ |
| 113 | [71] | ---\|------\|----?? | 15> | 178 | ---\|-----\|----?? | 15> | 178 | \|--\|--\|---\|---?? | 15> | 230 | \|--\|--\|---\|---?? | 15> | 230 |
| 114 | [72] | ----\|--??--\|--- | 9> | 51 | ---\|---------??--- | 11> | 193 | \|--\|-----??-\|-- | 9> | 51 | \|--\|-----??-\|-- | 11> | 193 |
| 115 | [73] | ---\|------??--- | 11> | 62 | ---\|-------??--- | 11> | 62 | \|-\|--\|-----??--\| | 12> | 61 | \|-\|--\|-----??--\| | 12> | 61 |
| 116 | [74] | ----\|--\|--??--- | 11> | 180 | -----\|--\|--??--- | 11> | 180 | --\|---\|-\|---?? | 15> | 232 | --??--\|---\|-\|- | 4> | 90 |
| 117 | [75] | -----\|---??--\|-- | 12> | 184 | -----\|---??--\|-- | 11> | 186 | \|----\|---??---\|- | 8> | 234 | --??--\|---\|-----\|- | 4> | 91 |
| 118 | [76] | ----??--\|--\|--- | 5> | 188 | -\|---\|--??----\| | 10> | 202 | ----??---\|--\|--- | 5> | 188 | -\|---\|--??----\| | 10> | 202 |
| 119 | [77] | ----\|-----\|---?? | 15> | 185 | ----\|-----\|---?? | 15> | 185 | \|-??--\|-\|--\|-- | <5 | 165 | ??--\|-\|--\|-\|- | 1> | 162 |

Ambiguity Tables for DVD
Main Tables

| value | | State 1 | shift | alt | State 2 | shift | alt | State 3 | shift | alt | State 4 | shift | alt |
|---|---|---|---|---|---|---|---|---|---|---|---|---|---|
| 120 | [78] | ----\|------??-- | 12> | 57 | ----??-----\|---\| | 5> | 189 | \|---\|--??---\|-- | 8> | 187 | \|---\|--??---\|-- | 8> | 187 |
| 121 | [79] | -----??-----\|-- | 6> | 162 | -\|----\|--\|----?? | 15> | 47 | ----??------\|--\| | <6 | 57 | -\|----\|--\|----?? | 15> | 47 |
| 122 | [7A] | -----\|------??  | 15> | 189 | -----\|-----\|--?? | 15> | 189 | \|---\|-----??---- | 11> | 189 | \|---\|-----??---- | 11> | 189 |
| 123 | [7B] | --\|--\|--??---\|-- | 9> | 194 | --\|---\|--??---\|-- | 9> | 194 | -----\|--??--\|--  | 9> | 191 | ??--\|---\|-----\|-- | 1> | 190 |
| 124 | [7C] | --\|--\|-----??--- | 12> | 195 | --\|--??----\|---- | 6> | 66 | \|----\|-----??--- | 12> | 192 | \|-----??----\|---- | 6> | 66 |
| 125 | [7D] | --\|---\|-----??-- | 13> | 197 | -\|-----\|---??--- | 11> | 207 | --\|---??----\|--- | 7> | 67 | -\|-----\|---??--\| | 11> | 207 |
| 126 | [7E] | --\|---\|--??--\|-- | 10> | 196 | --\|---\|--??--\|-- | 10> | 196 | -----\|--??--\|-- | 10> | 196 | -----\|--??--\|-- | 10> | 196 |
| 127 | [7F] | ---\|---\|----??-- | 13> | 201 | -\|-----\|---\|---?? | 15> | 51 | ---\|---??--\|---- | 8> | 70 | -\|-----\|--\|---?? | 15> | 51 |
| 128 | [80] | --??---\|--\|--\|-- | 3> | 200 | --??---\|--\|--\|-- | 3> | 200 | \|-----\|-----??-- | 13> | 197 | \|-----\|-----??-- | 13> | 197 |
| 129 | [81] | -----\|---\|---??-- | 13> | 204 | -\|-----??--\|---\| | 8> | 57 | ----\|---??--\|--- | 9> | 77 | -\|----\|---??--\| | 12> | 219 |
| 130 | [82] | --\|-----??---\|-- | 8> | 68 | --\|----??----\|-- | 8> | 68 | -----??--\|--\|-- | <8 | 196 | ??-----\|--\|--\|- | 1> | 211 |
| 131 | [83] | --\|------??----- | 11> | 69 | --\|---------??--\| | 7> | 217 | --\|---??---\|---- | 7> | 217 | --\|---??---\|---- | 7> | 217 |
| 132 | [84] | --\|--\|-----??--- | 12> | 202 | ---\|--??--\|----- | 7> | 73 | \|--??--\|--\|--\|- | <5 | 155 | ??-\|--\|--\|--\|- | 1> | 163 |
| 133 | [85] | ----\|------??--- | 13> | 79 | -\|------\|--\|--?? | 15> | 57 | ----??------\|--- | 5> | 209 | -\|-----\|--\|---?? | 15> | 57 |
| 134 | [86] | ---\|-----??---\|- | 9> | 74 | ---\|----??---\|- | 9> | 74 | \|------\|--??--- | 11> | 224 | \|-----\|----??--- | 11> | 224 |
| 135 | [87] | ---\|------??--- | 12> | 72 | ---??------\|---- | 4> | 205 | -----\|--??---\|-- | 9> | 205 | ---\|-----??--\|-- | 9> | 205 |
| 136 | [88] | ---\|--\|---??--- | 12> | 206 | ---\|-----??--\|-- | 8> | 76 | -----\|------??-- | 12> | 210 | -----??---\|----- | 6> | 76 |
| 137 | [89] | -----\|---??--\|-- | 10> | 78 | ----\|----??--\|- | 10> | 78 | -----\|-??--\|-- | 10> | 208 | -----\|---??--\|-- | 10> | 208 |
| 138 | [8A] | -----\|---\|--??-- | 13> | 208 | -\|--------\|----?? | 15> | 213 | ----??---\|--\|--- | <6 | 77 | -\|-----\|------?? | 15> | 213 |
| 139 | [8B] | --\|---\|--??---- | <6 | 76 | -----??--\|----\| | <6 | 76 | \|-----\|-----??-- | 13> | 212 | \|------??---\|-- | 7> | 78 |
| 140 | [8C] | -----??---\|--\|-- | 6> | 191 | ----??---\|--\|-- | <6 | 78 | --\|----\|------?? | 15> | 89 | --\|----\|------?? | 15> | 89 |
| 141 | [8D] | ----??-----\|-- | 6> | 192 | ----??------\|-- | <6 | 79 | \|------??---\|-- | 8> | 69 | \|------??---\|-- | 8> | 69 |
| 142 | [8E] | ----??-----\|-- | 6> | 210 | ----??-------\|- | <6 | 80 | -----??--\|---\|- | <8 | 208 | ??------\|--\|--\|- | 1> | 222 |
| 143 | [8F] | -----??---\|--\|-- | 6> | 211 | -----??----\|--\|- | <6 | 81 | \|------??---\|-- | 8> | 79 | \|------??---\|-- | 8> | 79 |
| 144 | [90] | -----\|---\|---??-- | 13> | 214 | -\|------??---\|-- | <6 | 77 | -----??---\|--\|- | <6 | 82 | -\|------??---\|-- | 9> | 77 |
| 145 | [91] | -----\|--\|--??--- | 12> | 215 | ----??--\|--\|-- | <6 | 83 | \|--??-----\|--- | 4> | 81 | \|--??-----\|--- | 4> | 81 |
| 146 | [92] | -----\|---\|---??- | 13> | 80 | ??----------\|-- | 2> | 69 | -----??------\|-- | 5> | 213 | -\|--------??----- | <12 | 215 |
| 147 | [93] | -----\|-----??--\|- | 10> | 81 | -----\|-----??--\|- | 10> | 81 | ✗ | ✗ | ✗ | ??--------\|------ | 1> | 215 |
| 148 | [94] | -----\|--\|---??-- | 13> | 217 | -\|------??--\|-- | 9> | 82 | -----??--\|---- | 9> | 82 | -\|------??---\|-- | 9> | 82 |
| 149 | [95] | -----\|--\|---??-- | 12> | 218 | -----\|--??--\|-- | 8> | 83 | ✗ | ✗ | ✗ | ??---------\|----- | 1> | 229 |
| 150 | [96] | ---\|------??--- | 12> | 85 | ---??------\|-- | 4> | 216 | -\|-----??---\|-- | 8> | 80 | -\|----\|------??-- | 13> | 218 |
| 151 | [97] | ----\|-----??--- | 9> | 86 | ---\|----??--\|-- | 9> | 86 | \|------??------ | <10 | 242 | ??--------\|------ | 1> | 234 |
| 152 | [98] | ---\|--\|---??-- | 13> | 220 | -\|----\|--??--\|-- | 7> | 85 | --\|------??---- | 8> | 87 | -\|-----\|---??--- | 12> | 214 |
| 153 | [99] | ---\|--\|-??---- | 12> | 222 | -\|----\|--??---- | 7> | 88 | --\|------??---- | 10> | 236 | \|--??----\|------ | 4> | 94 |
| 154 | [9A] | --\|------??-- | 11> | 90 | --\|-----\|--??-- | 11> | 90 | -\|------??-----\| | 8> | 71 | -\|----\|-----??-- | 13> | 212 |
| 155 | [9B] | --\|-----??----\|- | 8> | 91 | --\|----??----\|- | 8> | 91 | \|--??--\|--\|--\|- | 4> | 132 | \|--??--\|--\|--\|- | 4> | 132 |
| 156 | [9C] | --??---\|--\|--\|- | 3> | 221 | --??---\|--\|--\|- | 3> | 221 | \|--\|-\|--\|---?? | 15> | 237 | \|----\|--??--\|-- | 11> | 90 |
| 157 | [9D] | --\|---\|----??-- | 13> | 224 | -\|-----??------ | 11> | 92 | --\|---??-----\|- | 7> | 92 | \|------??---\|-- | 11> | 92 |
| 158 | [9E] | --\|--\|--??--\|- | 10> | 225 | -\|----\|--??--\|- | 10> | 225 | -\|---??------- | 8> | 203 | ??--\|-\|--------- | <2 | 6 |
| 159 | [9F] | --\|--\|-??--\|-- | 12> | 227 | --\|--??----\|---- | 6> | 93 | \|-\|-\|-??--\|-- | 10> | 86 | \|-\|--\|--??--\|-- | 10> | 86 |

Ambiguity Tables for DVD
Main Tables

| value | | State 1 | shift | alt | State 2 | shift | alt | State 3 | shift | alt | State 4 | shift | alt |
|---|---|---|---|---|---|---|---|---|---|---|---|---|---|
| 160 | [A0] | --\|--\|--??---\|-- | 9> | 228 | --\|--\|--??---\|-- | 9> | 228 | \|--\|--\|----??-- | 13> | 98 | \|--\|--\|----??-- | 13> | 98 |
| 161 | [A1] | -----\|----\|--?? | 15> | 233 | -??--------\|--- | 2> | 90 | ----\|--\|----??--\| | 12> | 91 | -\|---------??---- | <12 | 229 |
| 162 | [A2] | -----??----\|--\| | 7> | 235 | x | x | x | ---\|---\|---\|--?? | 15> | 238 | ??--\|---\|--\|--- | <2 | 119 |
| 163 | [A3] | -------\|-----?? | 15> | 96 | x | x | x | ---\|---??--\|--\| | 9> | 243 | ??--\|--\|--\|--\|- | <2 | 132 |
| 164 | [A4] | --------??----- | 9> | 237 | -\|--\|--\|---\|--?? | 15> | 235 | ----\|----\|----?? | 15> | 235 | -\|--\|---\|--\|--?? | 15> | 235 |
| 165 | [A5] | -\|--\|--\|--??--\| | 12> | 97 | -??--\|--\|-\|---\| | <3 | 248 | --??--\|--\|--\|-- | 4> | 119 | \|--??--\|--\|-\|-- | 4> | 119 |
| 166 | [A6] | --\|--\|----\|--?? | 15> | 100 | --\|--\|----\|--?? | 15> | 100 | --\|----??----\|-- | 8> | 241 | --\|----??----\|-- | 8> | 241 |
| 167 | [A7] | --\|--??--\|--\|--\| | 6> | 101 | -\|---\|--??----\|-- | 8> | 232 | \|----\|--??--\|--\| | 6> | 101 | ??--\|--\|-------\| | <2 | 120 |
| 168 | [A8] | --\|--\|-----??-- | 12> | 240 | --\|--??----\|---\| | 6> | 103 | --\|--\|--??--\|--\| | 10> | 99 | --\|--\|--\|--??-- | <14 | 88 |
| 169 | [A9] | --\|---\|----\|-?? | 15> | 103 | --\|---\|----\|-?? | 15> | 103 | ----\|-----??--\|- | 11> | 246 | \|----\|----??---- | <11 | 94 |
| 170 | [AA] | --\|---\|-------?? | 15> | 241 | --\|----\|------?? | 15> | 241 | ----\|--\|--??--\|- | 12> | 96 | \|----??--\|--\|--- | <6 | 238 |
| 171 | [AB] | --\|---??----\|--\| | 7> | 106 | -\|--\|-----??---- | 11> | 71 | --\|---??----\|--\| | 7> | 106 | ??--\|-----\|----- | <2 | 134 |
| 172 | [AC] | --\|-----??-----\| | 9> | 107 | --\|-----??------ | 9> | 107 | \|----??--\|--\|-- | 6> | 103 | ---??--\|--\|--\|--\| | <6 | 243 |
| 173 | [AD] | ---\|--\|---\|--?? | 15> | 109 | ---\|--\|---\|--?? | 15> | 109 | ---\|-----\|---?? | 15> | 102 | --??----\|--\|--\|- | <6 | 245 |
| 174 | [AE] | ---\|--\|-\|----?? | 12> | 244 | ---\|--??---\|--\| | 7> | 111 | ----\|-----??-- | 12> | 249 | \|---??------\|--- | <6 | 246 |
| 175 | [AF] | ---\|-----\|--?? | 15> | 111 | ---\|----\|---?? | 15> | 111 | ---\|----\|---?? | 15> | 105 | \|-----??---\|--\|- | <7 | 247 |
| 176 | [B0] | ---\|----\|-----?? | 15> | 245 | ---\|----\|-----?? | 15> | 245 | \|-----??----\|-- | 7> | 108 | \|----??----\|--\|- | <7 | 249 |
| 177 | [B1] | --??-\|--\|-\|--\| | <4 | 101 | ---\|-\|--\|---?? | 15> | 96 | --??--\|-\|--\|--\| | <4 | 101 | ??---\|---\|------ | <2 | 93 |
| 178 | [B2] | ---\|-----??---\|- | 10> | 115 | ---\|------??--- | 10> | 115 | ------\|-------?? | 15> | 251 | \|----??-------\|- | <8 | 250 |
| 179 | [B3] | ----\|--\|--\|--?? | 15> | 116 | ----\|-\|--\|--?? | 15> | 116 | -------\|-??------ | 9> | 110 | \|------??------- | <9 | 251 |
| 180 | [B4] | ----\|------??--\| | 12> | 248 | -\|--\|--??--\|--\| | 8> | 117 | -\|--\|--??--\|--\| | 8> | 253 | ??--\|--\|------- | <2 | 91 |
| 181 | [B5] | ---\|---??--\|--\| | 8> | 114 | -\|--\|----??--\|-- | 11> | 233 | ---\|---??--\|--\| | 8> | 114 | ??--\|-------\|--- | <2 | 122 |
| 182 | [B6] | ----\|---\|---\|-?? | 15> | 117 | ----\|---\|---\|-?? | 15> | 117 | -\|-----??-----\| | 9> | 85 | -\|--??--\|--\|--\|- | <6 | 253 |
| 183 | [B7] | -----\|---\|----?? | 13> | 249 | ----\|----\|---?? | 15> | 249 | -??----\|--\|--\| | 2> | 101 | ??-----\|--\|-\|- | <2 | 103 |
| 184 | [B8] | ----\|--??--\|--\| | 9> | 118 | -\|---\|--??--\|-- | 9> | 72 | ----\|----??--\|-- | 9> | 118 | ??---\|--\|-----\|- | <2 | 135 |
| 185 | [B9] | ----\|------??-- | 11> | 120 | ----\|-------??-- | 11> | 120 | \|---\|----??---- | 11> | 254 | \|--??-----\|----- | 4> | 122 |
| 186 | [BA] | -----\|--\|--??--\| | 12> | 252 | ----??--\|-\|---\| | <6 | 117 | \|---\|--\|----??-- | 13> | 120 | --??--\|-----\|--- | <5 | 221 |
| 187 | [BB] | -----\|----\|---?? | 15> | 253 | ---------\|---?? | 15> | 253 | \|----\|------??-- | 9> | 86 | \|--??--\|-\|--\|-- | <5 | 241 |
| 188 | [BC] | ------??-\|--\|--\| | 6> | 231 | -\|--\|-----??--\|- | 10> | 244 | ----??----\|--\|--\| | <6 | 118 | ??--\|----\|------ | <2 | 94 |
| 189 | [BD] | ------\|-----??-- | 12> | 121 | ----??-------\|- | <6 | 120 | \|--\|------??-- | 12> | 84 | \|--\|------??---- | <12 | 122 |
| 190 | [BE] | ------\|-\|--??-- | 13> | 254 | ---\|--??--\|----\| | 9> | 87 | \|---\|----??-- | 13> | 123 | ??--\|-----\|---- | <2 | 123 |
| 191 | [BF] | ------??--\|--\|-- | 7> | 87 | -\|---??----\|--- | 6> | 106 | \|----\|---??--\|- | 10> | 81 | ??---\|------\|--- | <2 | 124 |
| 192 | [C0] | ------??-----\|-- | 7> | 86 | ----\|----??--\|-- | 10> | 80 | \|---\|----\|--?? | 13> | 80 | ??---\|------\|--- | <2 | 126 |
| 193 | [C1] | --\|-\|--\|---??-- | 13> | 123 | -\|---??-----\|-- | 6> | 152 | --\|-\|--??--\|--- | 9> | 78 | ??--\|-------\|--- | <2 | 136 |
| 194 | [C2] | --\|--\|-----??-- | 10> | 84 | --\|-\|---??--\|-- | 10> | 84 | \|-----\|--\|--?? | 13> | 126 | \|-----??-\|---\|-- | <7 | 82 |
| 195 | [C3] | --\|--\|----??-- | 13> | 83 | -\|--\|--\|--\|--?? | 15> | 248 | ---??-------\|- | 6> | 125 | -\|--??--\|--\|-- | <6 | 236 |
| 196 | [C4] | --\|--??--\|-\|-- | 7> | 128 | --\|---??--\|-\|-- | 7> | 128 | \|---??---\|--\|- | 7> | 130 | \|----??--\|--\|--- | <7 | 81 |
| 197 | [C5] | --\|--??-------- | 7> | 130 | --\|---??-------- | 7> | 130 | \|----??-----\|- | 7> | 141 | -\|---??---\|---- | <7 | 80 |
| 198 | [C6] | --\|---\|----??-- | 13> | 126 | -\|---\|----\|--?? | 15> | 118 | --??-\|--\|---\|-- | 3> | 75 | ??--\|--\|-\|----\|- | <2 | 100 |
| 199 | [C7] | ---\|-\|--??--\|-- | 10> | 82 | ---\|--\|-??--\|-- | 10> | 82 | -\|----??----\|-- | 7> | 154 | ??----\|-----\|--- | <2 | 128 |

Ambiguity Tables for DVD
Main Tables

| value | | State 1 | shift | alt | State 2 | shift | alt | State 3 | shift | alt | State 4 | shift | alt |
|---|---|---|---|---|---|---|---|---|---|---|---|---|---|
| 200 | [C8] | ---??--\|--\|--\|-- | 4> | 80 | ---??--\|--\|--\|-- | 4> | 80 | --\|------??---- | 11> | 73 | \|--??-----\|------ | 4> | 134 |
| 201 | [C9] | ---\|---??----\|-- | 8> | 134 | ---\|---??----\|-- | 8> | 134 | ----\|--\|----??-- | 13> | 158 | \|--??--\|-----\|--- | <5 | 228 |
| 202 | [CA] | ---\|--\|------??-- | 11> | 81 | -\|---\|---??---\| | 11> | 254 | ---\|---??---\|--- | 7> | 127 | ??---\|----\|------ | <2 | 102 |
| 203 | [CB] | ---\|------??---- | 11> | 135 | ---\|------??---- | 11> | 135 | \|--\|---??--\|-- | 9> | 74 | \|-??---\|----\|-- | <5 | 239 |
| 204 | [CC] | ----\|----??--\|-- | 9> | 137 | ----\|---??--\|-- | 9> | 137 | ----\|--\|---??-- | 13> | 135 | \|-----\|---??--\|-- | <13 | 69 |
| 205 | [CD] | -----??-- | 12> | 133 | ----??-----\|--- | 5> | 74 | \|--\|---??--\|-- | 10> | 67 | \|---??---\|----\|-- | <6 | 74 |
| 206 | [CE] | ----\|--\|----??--- | 13> | 79 | -\|-----\|---\|---?? | 15> | 125 | -----\|--??---\|--- | 8> | 129 | ??-----\|---\|----\|- | <2 | 104 |
| 207 | [CF] | -----\|--\|---??--- | 13> | 76 | -\|-----??---\|--- | 7> | 129 | -----\|--??--\|--- | 9> | 138 | ??----\|-----\|--- | <2 | 105 |
| 208 | [D0] | ------\|---??--\|-- | 10> | 140 | -----\|---??--\|-- | 10> | 140 | \|-----??--\|--\|-- | 7> | 142 | \|-----??--\|-\|-- | <7 | 67 |
| 209 | [D1] | -----\|-------??--- | 13> | 141 | -\|-----\|---\|--?? | 15> | 129 | -----??------\|--- | <6 | 133 | ??------\|---\|-\|- | <2 | 107 |
| 210 | [D2] | -----??-----\|--\|- | 7> | 73 | -\|-------\|----?? | 15> | 62 | ----\|-----??-- | 13> | 66 | ??----\|-----\|--- | <2 | 109 |
| 211 | [D3] | ------??--\|--\|-- | 7> | 72 | -??----\|--\|---\|-- | 2> | 128 | -----\|--\|--??-- | 13> | 137 | ??-----\|--\|-\|-- | <2 | 130 |
| 212 | [D4] | ------\|--\|---??-- | 13> | 70 | -\|------??----\|-- | 8> | 144 | -----\|------??-- | 7> | 143 | ??---\|-----\|--- | <2 | 141 |
| 213 | [D5] | ------\|----??--- | 13> | 142 | -\|-------??----\| | 10> | 157 | -----??---------- | <6 | 146 | ??-----\|-----\|-- | <2 | 110 |
| 214 | [D6] | -----\|---??--\|-- | 10> | 143 | ------\|---??--\|-- | 10> | 143 | -\|-----??---\|--- | 7> | 150 | ??----\|-----\|--- | <2 | 139 |
| 215 | [D7] | -----\|---\|---??--- | 13> | 68 | -\|--------??---- | 11> | 146 | -----\|---??--\|-- | 9> | 144 | ??--------\|----- | <2 | 147 |
| 216 | [D8] | -----\|------??--- | 12> | 146 | ----??-----\|--- | 5> | 69 | \|--\|-\|-----??-- | 12> | 223 | \|--\|--\|---??---- | <12 | 56 |
| 217 | [D9] | -----\|----??---- | 9> | 147 | -\|----??----\|-- | 9> | 147 | \|--\|---??----\|-- | 8> | 239 | \|----??-----\|-- | <8 | 131 |
| 218 | [DA] | -----\|--\|----??-- | 13> | 66 | -\|-----??--\|--- | 8> | 148 | ----\|--??---\|-- | 8> | 148 | ??-----\|------\|-- | <2 | 143 |
| 219 | [DB] | --\|------??---- | 11> | 150 | ---\|------??---- | 11> | 150 | -\|-----??---\|--\| | 8> | 111 | ??----\|-----\|--\| | <2 | 108 |
| 220 | [DC] | -----\|---??---- | 8> | 151 | -??----\|----??--- | 8> | 151 | \|--\|--\|----??---- | 12> | 160 | \|--\|--\|---??---- | <12 | 60 |
| 221 | [DD] | ---??--\|--\|--\|-- | 4> | 65 | ---??--\|--\|--\|-- | 4> | 65 | \|--\|--\|----??-- | 13> | 166 | \|--\|--??----\|--- | <8 | 160 |
| 222 | [DE] | --\|--\|-----??-- | 13> | 64 | -??------\|--\|--\| | 2> | 156 | --\|-\|-----??---- | 7> | 152 | ??-----\|--\|-\|-- | <2 | 142 |
| 223 | [DF] | -----\|--\|--??-- | 10> | 63 | --??--\|--\|--\|-- | <4 | 158 | \|--\|-\|-----??--- | <13 | 216 | --\|-\|-\|----??--- | <13 | 216 |
| 224 | [E0] | --\|--??------\|- | <7 | 61 | -??---\|------\|-- | <3 | 75 | \|--??------\|--- | <5 | 73 | \|---\|-----??--- | <12 | 134 |
| 225 | [E1] | --\|--??---\|--\|-- | <7 | 60 | -??---\|----\|--- | <3 | 73 | \|--\|-\|-\|-----?? | 15> | 54 | \|--\|--\|---??---\|- | 10> | 113 |
| 226 | [E2] | --\|--??--\|--\|-- | <7 | 59 | -\|---??---\|--\|-- | <7 | 72 | -??--\|--\|--\|--\| | <3 | 63 | ??----\|----\|---- | <2 | 137 |
| 227 | [E3] | -\|-\|-----??-- | <13 | 159 | -??--\|---\|----- | 8> | 240 | -??--\|--\|------- | <3 | 48 | -\|--\|------??-- | <14 | 65 |
| 228 | [E4] | --\|--\|--??-\|--\|-- | <10 | 160 | -??-\|-----\|--- | <3 | 72 | \|--\|--??------ | <8 | 223 | \|--\|--??------- | <8 | 223 |
| 229 | [E5] | --\|-\|---\|--??--- | <13 | 58 | -\|--------??--- | 11> | 161 | -??--\|--\|--\|--- | <3 | 64 | ??---------\|----- | <2 | 149 |
| 230 | [E6] | --\|-----??----- | <10 | 57 | -??--------\|--- | <3 | 234 | \|--\|--\|--??---\|- | <11 | 54 | \|--\|--\|---??---- | <16 | 113 |
| 231 | [E7] | -----??-\|--\|-\|- | <7 | 188 | -\|--\|--\|--\|--?? | 15> | 54 | \|--\|--??--\|---\|- | <8 | 113 | ??---\|--\|-\|---\|- | <2 | 156 |
| 232 | [E8] | ----??-----\|-- | <7 | 187 | -\|--\|--??---\|-- | <9 | 167 | \|--\|--??----\|-- | <8 | 115 | ??----\|-----\|-- | <2 | 187 |
| 233 | [E9] | -----??----\|--- | <7 | 189 | -\|--\|-----??--- | <12 | 181 | \|--\|---??--\|-\|- | <9 | 116 | ??--\|------\|---- | <2 | 189 |
| 234 | [EA] | ------??--\|--\|- | <8 | 161 | -\|------??----- | <10 | 36 | --\|---??--\|--\|- | <9 | 117 | ??------\|-------- | <2 | 151 |
| 235 | [EB] | ------??---\|--\| | <8 | 162 | -\|--\|--\|---??--- | <12 | 54 | --\|---??--\|-\|-- | <10 | 140 | -\|--\|----??----\|- | <12 | 54 |
| 236 | [EC] | ------??----\|-- | <9 | 163 | -\|-\|--??---\|--- | <9 | 164 | \|--\|----??--\|-- | <11 | 153 | -\|--\|---??---\|-- | <9 | 164 |
| 237 | [ED] | -------??------ | <10 | 164 | -\|-\|--\|--??---- | <10 | 177 | --??-\|---\|----- | <5 | 53 | -\|--\|---??------ | <10 | 177 |
| 238 | [EE] | --\|-\|----??---- | <12 | 166 | -??--\|-----\|-- | <3 | 34 | --\|---\|---??--- | <5 | 52 | ----\|??--\|--\|--- | 5> | 170 |
| 239 | [EF] | --\|--??--------\| | <7 | 48 | -??---\|-------- | <3 | 29 | \|---\|---??----\|- | <9 | 217 | --\|---??----\|-- | <9 | 217 |

35

Ambiguity Tables for DVD
Main Tables

| value | State 1 | shift | alt | State 2 | shift | alt | State 3 | shift | alt | State 4 | shift | alt |
|---|---|---|---|---|---|---|---|---|---|---|---|---|
| 240 [F0] | --\|--\|------??-- | <13 | 168 | -\|--\|--??----\|-- | <9 | 227 | -??--\|------\|--\| | <3 | 32 | ??--\|---\|----\|-- | <2 | 203 |
| 241 [F1] | --\|---??------- | <8 | 47 | -??----\|-------\| | <3 | 27 | --\|---??----\|-- | <9 | 166 | --\|---??----\|-- | <9 | 166 |
| 242 [F2] | --??-\|----\|--\|- | <4 | 169 | --??--\|-----\|--!- | <4 | 169 | ------??------- | <9 | 42 | ------??------- | <9 | 42 |
| 243 [F3] | --??---\|------\|- | <4 | 170 | --??---\|------\|- | <4 | 170 | \|--??----\|--\|--\| | <5 | 51 | ---??---\|--\|-- | 5> | 172 |
| 244 [F4] | --??--\|------\|-- | <4 | 171 | -\|--\|----??---- | <11 | 188 | --??--\|-----\|--\| | <4 | 171 | ??--\|-----\|----\| | <2 | 169 |
| 245 [F5] | --??----\|------- | <4 | 172 | --??---\|------- | <4 | 172 | --??-----\|---\|- | <5 | 50 | \|---\|------\|---?? | 15> | 169 |
| 246 [F6] | ---??--\|---\|--\|- | <5 | 175 | ---??--\|---\|--\|- | <5 | 175 | \|--??-------\|---\| | <5 | 49 | ---\|------??---\| | <12 | 169 |
| 247 [F7] | ---??---\|------\|- | <5 | 176 | ---??---\|------\|- | <5 | 176 | \|---??------\|-\|- | <6 | 47 | ---??-----\|--\|- | <6 | 47 |
| 248 [F8] | ---??-\|----\|--\| | <5 | 181 | -\|--??-\|--\|--- | <6 | 49 | ---??--\|----\|-- | <5 | 181 | ??---\|--\|--\|--- | <2 | 170 |
| 249 [F9] | ---??----\|----\|- | <5 | 178 | ---??----\|----\|- | <5 | 178 | \|---??-------\|-- | <6 | 44 | ---??------\|-\|- | <6 | 44 |
| 250 [FA] | ----??--\|--\|--\|- | <6 | 182 | ----??--\|--\|--\|- | <6 | 182 | \|----??-------\|- | <7 | 41 | \|---??-------\|- | <7 | 41 |
| 251 [FB] | ---??---\|------\|- | <6 | 183 | ----??---\|----\|- | <6 | 183 | \|----??------- | <8 | 37 | -----??-------\| | <8 | 37 |
| 252 [FC] | ----??--\|----\|-\| | <6 | 184 | -\|--??----\|---\|- | <6 | 40 | ----??---\|----\|- | <6 | 184 | ??---\|-----\|---- | <2 | 173 |
| 253 [FD] | ----??---\|-----\| | <6 | 185 | ----??---\|----- | <6 | 185 | ??--\|---\|---\|--\| | <2 | 163 | -\|--\|--??---\|-- | <9 | 180 |
| 254 [FE] | ----??--\|----\|-- | <7 | 208 | -\|--??-----\|--- | <6 | 35 | \|--\|------??---- | <12 | 185 | ??---\|-----\|---- | <2 | 174 |
| 255 [FF] | -----??-----\|--- | <7 | 209 | -\|---??----\|--\|- | <7 | 34 | \|--??--\|---\|---- | <5 | 58 | ??----\|-----\|--\|- | <2 | 175 |

Ambiguity Tables for DVD
Substitute Tables

| value | | State 1 | shift | alt | State 2 | shift | alt | State 3 | shift | alt | State 4 | shift | alt |
|---|---|---|---|---|---|---|---|---|---|---|---|---|---|
| 0 | [00] | ----??--\|------ | <6 | 11 | ----??--\|------- | <6 | 11 | ??--\|----\|--\|--- | <2 | 31 | ??--\|----\|--\|--- | <2 | 31 |
| 1 | [01] | ---??--\|-------- | <5 | 12 | ----??--\|------- | <5 | 12 | ??--\|----\|--\|--- | <2 | 11 | ??--\|----\|--\|--- | <2 | 11 |
| 2 | [02] | --??--\|--------- | <4 | 13 | --??--\|--------- | <4 | 13 | ??--\|--------\|--\| | <2 | 44 | ??--\|--------\|--\| | <2 | 44 |
| 3 | [03] | ------??--\|----- | <7 | 10 | -\|---\|--------?? | <16 | 17 | ------??-------- | 7> | 42 | -\|---\|--------?? | <16 | 17 |
| 4 | [04] | -------??--\|---- | <8 | 14 | -\|--??--------\|- | 5> | 17 | -\|--------??-- | <14 | 35 | -\|--??--------\|- | 5> | 17 |
| 5 | [05] | --------??--\|--- | <9 | 15 | -\|------??------ | 7> | 7 | -\|------??--\|-- | <11 | 36 | -\|------??------ | 7> | 7 |
| 6 | [06] | ---------??--\|-- | <10 | 16 | -\|--??--------\|- | 5> | 28 | -\|-------??--\|-- | <10 | 45 | ??--\|-----\|--\|--- | <2 | 25 |
| 7 | [07] | --------??--\|--- | <10 | 19 | -\|----??-------- | <8 | 5 | -\|--------??-- | <14 | 40 | ??---\|--------\|-- | <2 | 42 |
| 8 | [08] | --------??--\|--- | <9 | 20 | -\|--\|--??--\|---- | <9 | 55 | --\|------??--\|-- | <11 | 43 | ??--\|---\|--\|----- | <2 | 23 |
| 9 | [09] | -------??--\|---- | <8 | 21 | -\|--\|----??--\|-- | <11 | 53 | --\|-----??--\|-- | <10 | 57 | ??--\|-----\|--\|--- | <2 | 30 |
| 10 | [0A] | -----??--\|------ | <6 | 30 | -----??--\|------ | <6 | 30 | ✗ | ✗ | ✗ | ✗ | ✗ | ✗ |
| 11 | [0B] | --??---\|-------- | <5 | 31 | ---??--\|-------- | <5 | 31 | --??---\|--\|--\|--- | <5 | 6 | \|---\|----\|--??-- | 13> | 74 |
| 12 | [0C] | --??---\|-------- | <4 | 32 | --??---\|-------- | <4 | 32 | ??--\|----\|--\|--- | <2 | 68 | ??---\|---\|--\|---- | <2 | 68 |
| 13 | [0D] | -\|---??-------- | 7> | 32 | -??---\|--------- | <3 | 5 | \|---??--------\|- | <5 | 4 | \|---??--------\|- | 5> | 66 |
| 14 | [0E] | -\|-??--\|------ | <7 | 33 | -\|-??---------\|- | 5> | 26 | \|---\|--??--\|---- | <9 | 46 | ??--\|----------\|- | <2 | 13 |
| 15 | [0F] | -----??--\|------ | <8 | 34 | --\|---??--\|----- | <9 | 59 | -\|----??--\|----- | <8 | 56 | -\|---\|--??--\|---- | <9 | 59 |
| 16 | [10] | ------??--\|----- | <9 | 35 | -\|---??-------\|- | <7 | 3 | ??--\|--------\|-- | <2 | 70 | ??--\|-------\|---- | <2 | 37 |
| 17 | [11] | -----??--\|------ | <10 | 36 | --??--\|--------\|- | <6 | 4 | ??--\|---\|--\|--- | <2 | 71 | ??---\|---------- | <2 | 41 |
| 18 | [12] | -----??--\|------ | <10 | 38 | -\|--\|-??--\|----- | <11 | 50 | -\|--\|--??--\|---- | <9 | 58 | ??--\|----\|--\|--- | <2 | 22 |
| 19 | [13] | ------??--\|----- | <9 | 39 | -\|-\|-\|--??--- | 11> | 55 | -\|--??--\|------ | <8 | 60 | -\|---\|-\|--??---- | 11> | 55 |
| 20 | [14] | ------??--\|----- | <8 | 40 | -\|--\|---??----- | 11> | 59 | ??--\|---\|--\|--- | <2 | 82 | -\|--\|---??----- | 11> | 59 |
| 21 | [15] | ----??--\|------- | <7 | 37 | -\|--\|---??--\|- | <12 | 40 | ??--\|----------- | <2 | 84 | ??--\|----------\|- | <2 | 47 |
| 22 | [16] | ---??--\|-------\| | <6 | 43 | -----??--\|------ | <6 | 43 | \|--??------\|--\|- | <5 | 5 | \|---\|----??--\|-- | <11 | 74 |
| 23 | [17] | ---??--\|-------- | <5 | 45 | ----??--\|------- | <5 | 45 | --??--\|-------- | <5 | 14 | \|---??--\|------ | 5> | 69 |
| 24 | [18] | --??--\|--------- | <4 | 47 | --??--\|-------\|- | <4 | 47 | ??--\|---\|---\|-- | <2 | 87 | -\|--\|--??---\|--- | <9 | 79 |
| 25 | [19] | -\|--\|---------?? | <16 | 48 | -??--\|---------- | <3 | 3 | ---??--------- | <5 | 7 | \|----------??-- | <14 | 84 |
| 26 | [1A] | -----??--\|--\|-- | <10 | 50 | -\|--??------\|-- | <6 | 14 | ----\|--------?? | <16 | 41 | ??--\|-------\|-- | <2 | 66 |
| 27 | [1B] | -------??--\|--- | <9 | 52 | -\|------??------ | <8 | 16 | ---??----------\|- | 5> | 41 | ??--\|----\|------ | <2 | 251 |
| 28 | [1C] | -----??--\|----- | <8 | 54 | -\|-??---------\|- | <6 | 6 | --\|------??--\|- | <13 | 49 | ??--\|-\|-------- | <2 | 80 |
| 29 | [1D] | -----??--\|----- | <7 | 41 | -\|--??-------\|- | <7 | 17 | --\|--------??-- | <12 | 50 | ??--\|--\|------\|- | <2 | 250 |
| 30 | [1E] | ----??--\|------ | <5 | 56 | ---??---------- | <5 | 56 | --??----\|--\|-- | <5 | 8 | \|--??--\|--\|--- | 5> | 81 |
| 31 | [1F] | --??---\|------- | <4 | 57 | --??--\|-------- | <4 | 57 | --??---\|--\|--- | <5 | 9 | \|---??--\|--\|--- | 5> | 82 |
| 32 | [20] | -\|---??------- | <8 | 13 | -??---\|-------- | <3 | 7 | ??--\|----------\|- | <2 | 249 | ??--\|----\|--\|-- | <2 | 249 |
| 33 | [21] | ---??---\|----- | <6 | 67 | ----??----\|--- | <6 | 67 | ??--\|----\|--\|-- | <2 | 243 | ??--\|----\|--\|-- | <2 | 243 |
| 34 | [22] | ------??--\|--- | <7 | 69 | -\|--??--\|--\|- | <6 | 21 | --??--\|------- | <5 | 15 | ??--\|------\|--- | <2 | 247 |
| 35 | [23] | -----??--\|--- | <8 | 71 | -\|--\|-----??-- | <12 | 244 | -\|--\|---??----- | <13 | 73 | ??--\|-----\|--- | <2 | 246 |
| 36 | [24] | ----??--\|---- | <9 | 73 | -\|--\|-??------ | <9 | 7 | -\|--\|---??-- | <10 | 239 | ??--\|-------- | <2 | 242 |
| 37 | [25] | ----??--\|---- | <6 | 77 | ----??---------- | <6 | 77 | ----??---------- | <7 | 26 | \|-----------?? | <16 | 250 |
| 38 | [26] | -----??----\|--- | <9 | 86 | \|-??----------\|- | <6 | 18 | --??--\|-\|----- | <5 | 18 | ??--\|----\|-\|-- | <2 | 67 |
| 39 | [27] | -----??----\|--- | <8 | 255 | -\|--??----\|-- | <6 | 9 | -\|--??-\|-\|---- | <5 | 19 | ??---\|----\|-\|- | <2 | 81 |

Ambiguity Tables for DVD
Substitute Tables

| value | | State 1 | shift | alt | State 2 | shift | alt | State 3 | shift | alt | State 4 | shift | alt |
|---|---|---|---|---|---|---|---|---|---|---|---|---|---|
| 40 | [28] | -----??----\|--- | <7 | 74 | -\|--\|----??--\|- | <11 | 237 | --\|--------??--- | <13 | 254 | ??--\|-----\|---\|- | <2 | 245 |
| 41 | [29] | ----??---\|----- | <6 | 249 | ----??---\|----- | <6 | 249 | ---??------\|- | <6 | 27 | \|----??--------\|- | 6> | 250 |
| 42 | [2A] | ----??-\|-----\|- | <6 | 247 | ----??-\|-----\|- | <6 | 247 | ---??--------- | <8 | 3 | \|------??-------- | 8> | 242 |
| 43 | [2B] | ---??---\|------ | <5 | 245 | ---??---\|------ | <5 | 245 | --\|----??---\|-- | <10 | 241 | --\|----??---\|-- | <10 | 241 |
| 44 | [2C] | ---??--\|------- | <5 | 243 | ---??--\|------- | <5 | 243 | --??-------\|-- | <5 | 28 | \|---\|------??--\|- | <13 | 246 |
| 45 | [2D] | --??---\|------- | <4 | 241 | --??---\|------- | <4 | 241 | --\|---??---\|--- | <9 | 228 | --\|---??---\|--- | <9 | 228 |
| 46 | [2E] | --??--\|-------- | <4 | 239 | --??--\|-------- | <4 | 239 | --\|---??---\|--- | <8 | 216 | --\|--??---\|---- | <8 | 216 |
| 47 | [2F] | --\|--??--------\| | <7 | 25 | -??---\|-------- | <3 | 16 | --??----\|--\|- | <5 | 29 | \|-----??----- | <12 | 245 |
| 48 | [30] | --\|--\|--------?? | 15> | 25 | -??--\|-------\|- | <3 | 17 | ??--\|------\|--- | <2 | 210 | -\|---\|----??--- | <13 | 193 |
| 49 | [31] | --------??----\|- | <10 | 236 | --\|--\|--??--\|--- | <9 | 235 | \|-----------??--- | <12 | 236 | ??---\|---\|---\|-- | <2 | 238 |
| 50 | [32] | -------??---\|-- | <9 | 235 | --\|--\|---??--\|--- | <10 | 240 | \|--\|-----??--\|-- | <11 | 235 | ??---\|----\|---\|- | <2 | 74 |
| 51 | [33] | -------??-\|-\|- | <9 | 234 | -\|--??--\|---\|- | <6 | 8 | \|--\|----??---\|-- | <10 | 234 | ??---\|--\|--\|---- | <2 | 69 |
| 52 | [34] | ------??--\|--\|- | <8 | 233 | -\|--??--\|--\|---- | <6 | 15 | \|--\|----??---\|-- | <9 | 232 | ??---\|--\|--\|--- | <2 | 83 |
| 53 | [35] | ------??-\|--\|- | <8 | 232 | -\|--\|---??--\|-- | <10 | 232 | \|--\|--??--\|---- | <8 | 230 | -\|--\|---??---\|- | <10 | 232 |
| 54 | [36] | ------??---\|-----\| | <7 | 253 | -\|--\|--\|--\|---?? | <16 | 231 | \|--\|--\|---??-- | <16 | 225 | -\|--\|--\|---?? | <16 | 231 |
| 55 | [37] | -----??--\|----\| | <7 | 251 | -\|--\|--\|--??---- | <12 | 19 | ??----\|------\|-- | <2 | 176 | -\|--\|--\|--??---- | <12 | 19 |
| 56 | [38] | --??------\|----- | <4 | 230 | \|--??------\|----- | <7 | 253 | \|--\|-----??----- | 11> | 216 | \|--\|-----??----- | 11> | 216 |
| 57 | [39] | --\|----??------- | <9 | 32 | -??---\|-------- | <3 | 36 | \|--\|---??---\|--- | <9 | 221 | \|--\|---??---\|--- | <9 | 221 |
| 58 | [3A] | --\|--\|--\|--??--- | 12> | 229 | -??--\|--\|--\|---- | <3 | 51 | \|--\|--??---\|---- | <8 | 220 | \|--\|--??---\|--- | <8 | 220 |
| 59 | [3B] | --\|--\|--??--\|- | <10 | 229 | -\|--\|--\|-??---- | <12 | 20 | -??--\|--\|-\|--- | <3 | 12 | -\|--\|--\|--??---- | <12 | 20 |
| 60 | [3C] | --\|--\|---??--\|- | <11 | 228 | -??--\|-----\|-- | <3 | 38 | \|--\|-\|---??---- | 11> | 220 | \|--\|--\|---??---- | 11> | 220 |
| 61 | [3D] | --\|--\|------??-- | <14 | 227 | -??-\|-------\|-- | <3 | 26 | ??----\|--\|--\|- | <2 | 194 | ??-------\|--\|- | <2 | 194 |
| 62 | [3E] | --??-\|--\|--\|--- | <4 | 226 | -\|------??-----\| | <9 | 27 | --??--\|--\|--\|- | <4 | 226 | ??-----\|--\|--- | <2 | 179 |
| 63 | [3F] | --??--\|---\|--\|-- | <4 | 225 | --??--\|---\|--\|-- | <4 | 225 | ??----\|--\|--\|-- | <2 | 211 | -\|---??--\|--\|-- | <7 | 12 |
| 64 | [40] | --??--\|-------- | <4 | 224 | ??--\|--\|--\|---- | <2 | 224 | ??--\|--\|--\|---- | <2 | 204 | ??--\|--\|--\|---- | <2 | 204 |
| 65 | [41] | ---??--\|--\|--\|- | <5 | 221 | ---??--\|--\|--\|- | <5 | 221 | ??--\|--\|--\|--- | <2 | 201 | ??--\|--\|--\|--- | <2 | 201 |
| 66 | [42] | ---??--\|------- | <5 | 220 | ---??--\|------- | <5 | 220 | ---??------\|-- | <6 | 13 | \|---??--\|------ | <6 | 13 |
| 67 | [43] | ---??--\|------- | <5 | 219 | ---??-----\|---- | <5 | 219 | \|---??----\|--- | <6 | 22 | \|---??---\|--\|-- | <6 | 22 |
| 68 | [44] | ----??-\|----\|-- | <6 | 217 | ----??-\|----\|-- | <6 | 217 | \|---??----\|--- | <6 | 11 | ---??---\|--\|- | <6 | 11 |
| 69 | [45] | ----??---\|----- | <6 | 216 | ----??---\|----- | <6 | 216 | ---??--\|--\|--- | <6 | 23 | \|---??--\|----- | <6 | 23 |
| 70 | [46] | -----??---\|--\|- | <7 | 214 | -\|---??--\|---- | <7 | 28 | --??--\|------ | <5 | 35 | ??---\|-------\|- | <2 | 197 |
| 71 | [47] | -----??-----\|-- | <7 | 213 | -\|-\|---??-\|--- | <12 | 171 | --??-\|----\|--- | <5 | 45 | ??----\|-----\|- | <2 | 224 |
| 72 | [48] | ------??-\|--\|-- | <8 | 211 | \|--\|--??--\|--\|-- | <6 | 50 | \|--??-\|----\|-- | <5 | 46 | ??-----\|---\|-- | <2 | 205 |
| 73 | [49] | ------??-----\|- | <8 | 210 | \|--\|-??---\|--\|- | <7 | 38 | -\|------??------ | <12 | 200 | ??----\|---\|--\|- | <2 | 208 |
| 74 | [4A] | -----??-\|----- | <6 | 205 | -\|--??-------\|- | <6 | 205 | \|--\|-\|----??-- | <6 | 36 | -\|--\|---??-\|-- | <10 | 203 |
| 75 | [4B] | --??--\|--\|---\|- | <4 | 198 | -\|--??-------\|- | <7 | 26 | -\|--??----\|--- | <4 | 198 | -\|---??-----\|- | <7 | 26 |
| 76 | [4C] | -----??-\|------ | <6 | 204 | -\|--??-------\|- | <6 | 204 | ??----\|-\|----- | <2 | 192 | -\|------??----- | <13 | 191 |
| 77 | [4D] | ---??----\|---- | <5 | 203 | ---??-----\|--- | <5 | 203 | ??-\|-\|-------- | <2 | 190 | -\|--??-\|--\|--- | <6 | 24 |
| 78 | [4E] | -\|-\|-\|--??---- | <10 | 193 | -\|------??-----\|- | <8 | 29 | -??-----\|--\|- | <3 | 20 | ??----\|-------\|- | <2 | 178 |
| 79 | [4F] | ---??-\|----\|--- | <5 | 201 | ----??-\|------\|- | <5 | 201 | ??--\|--\|----\|--- | <2 | 186 | ??--\|-\|----\|--- | <2 | 186 |

Ambiguity Tables for DVD
Substitute Tables

| value | State 1 | shift | alt | State 2 | shift | alt | State 3 | shift | alt | State 4 | shift | alt |
|---|---|---|---|---|---|---|---|---|---|---|---|---|
| 80 [50] | ---??--\|--\|--\|-- | <5 | 200 | ---??--\|--\|--\|-- | <5 | 200 | \|---??--------\|-- | <6 | 25 | \|---??--------\|-- | <6 | 25 |
| 81 [51] | --??--\|-------\|-- | <4 | 197 | --??--\|-------\|-- | <4 | 197 | \|---??----\|--\|-- | <6 | 30 | \|---??----\|--\|-- | <6 | 30 |
| 82 [52] | --??--\|----\|--\|-- | <4 | 196 | --??--\|----\|--\|-- | <4 | 196 | \|---??---\|--\|--- | <6 | 31 | \|---??---\|--\|--- | <6 | 31 |
| 83 [53] | --\|--\|------??-- | <14 | 195 | -??--\|--------\|-- | <3 | 28 | \|---??---\|--\|---- | <6 | 38 | ??---\|--\|--\|---- | 1> | 52 |
| 84 [54] | --\|--\|----??--\|-- | <11 | 194 | -??--\|----\|--\|-- | <3 | 39 | \|--??--------\|--- | <5 | 40 | \|---\|-------??--- | <13 | 189 |
| 85 [55] | --\|--\|--\|--??--- | 12> | 193 | -??--\|--\|--\|---- | <3 | 52 | ??---\|---\|--\|-- | <2 | 172 | ??---\|---\|--\|--\| | <2 | 172 |
| 86 [56] | ------??------ | <8 | 192 | -\|---??---\|--\|-- | <7 | 39 | \|--??----\|---\|-- | <5 | 43 | ??---\|---\|--\|-- | <2 | 196 |
| 87 [57] | ------??--\|--\|-- | <8 | 191 | -\|--??---\|----\|-- | <6 | 53 | \|--??---\|---\|--- | <5 | 57 | -\|--??---\|---\|-- | <6 | 53 |

The invention claimed is:

1. A method for producing a signature on a DVD disc comprising:
   partially disabling error correction prior to EFM+ encoding; and
   introducing at least one ambiguous symbol into an ECC block during EFM+ encoding, said ambiguous symbol having a value which can be read as either a first value or a second alternate value.

2. The method according to claim 1, wherein introducing at least one ambiguous symbol comprises:
   selecting at least one byte in at least one column of the ECC block.

3. The method according to claim 2, wherein introducing at least one ambiguous symbol further comprises:
   encoding at least one data symbol in said column by the corresponding ambiguous representation of said at least one data symbol.

4. The method according to claim 2, wherein partially disabling error correction comprises:
   invalidating at least one outer parity symbol (P0) of the 16 PO bytes corresponding to the at least one column; and
   invalidating at least one inner parity symbol (PI) of the 10 PI bytes corresponding to each row containing one of the invalidated outer parity symbols.

5. The method according to claim 4, wherein invalidating comprises:
   invalidating the bits in said at least one outer parity symbol (P0) and said at least one inner parity symbol (PI).

6. The method according to claim 2, wherein partially disabling error correction comprises:
   invalidating at least eight outer parity symbols (P0) of the 16 PO bytes corresponding to the at least one column.

7. The method according to claim 6, wherein partially disabling error correction further comprises:
   invalidating at least five inner parity symbols (PI) of the 10 PI bytes corresponding to each row containing one of the invalidated outer parity symbols.

8. The method according to claim 6, wherein invalidating comprises:
   invalidating the bits in at least one of the at least eight outer parity symbols (P0).

9. The method according to claim 7, wherein invalidating comprises:
   invalidating the bits in at least one of the at least five inner parity symbols (PI).

10. The method according to claim 6, wherein invalidating comprises:
    substituting at least one of the at least eight outer parity symbols (P0) with a different symbol.

11. The method according to claim 7, wherein invalidating comprises:
    substituting the bits in at least one of the at least five inner parity symbols (PI) with a different symbol.

12. A method for validating a signature on a DVD comprising:
    comparing the number of reads for at least one unprocessed sector within the ECC block to be read correctly with the number of reads for at least one processed sector within said ECC block to be read correctly, wherein said ECC block comprises a partially disabled ECC written to the DVD.

13. The method according to claim 12, wherein said comparing comprises:
    pre-determining a maximum allowable number of reads, reading the processed sector up to said maximum allowable number of reads or until successfully read;
    comparing the number of reads of at least one unprocessed sector with the number of reads to successfully read of said at least one processed sector; and
    if the number of reads for the processed sector is greater than the number of reads for an unprocessed sector then the signature is valid.

14. A method for validating a signature on a DVD comprising:
    comparing the time to successfully read at least one unprocessed sector within the ECC block with the time to read at least one processed sector within said ECC block, wherein said ECC block comprises a partially disabled ECC written on to the DVD.

15. The method according to claim 14, wherein said comparing comprises:
    reading said at least one processed sector until said at least one processed sector is successfully read or the reading of said at least one processed sector is timed out;
    determining the time of reading said at least one processed sector; and
    comparing the time to read at least one unprocessed sector with the time to successfully read said at least one processed sector; and
    if the time of reading the processed sector is greater than the time of reading an unprocessed sector then the signature is valid.

16. A method for producing a signature on a digital optical disc (DVD) comprising:
    altering the value of at least one component in the lead-in zone of the DVD,
    whereby, on reading the DVD structure of an authentic DVD, the altered value of said at least one component will be returned.

17. The method according to claim 16, wherein altering at least one component comprises:
    changing the Burst Cutting Area (BCA) descriptor.

18. The method according to claim 17, wherein changing the BCA descriptor comprises:
    setting the BCA descriptor to 0x80.

19. The method according to claim 16, wherein altering at least one component comprises:
    changing the Disc manufacturing information (DMI).

20. The method according to claim 19, wherein changing the DMI comprises:
    placing the DMI in one of a group of bytes including 0x01, 0x08, 0x10 and 0x80.

21. A DVD encoder comprising;
    an error correction disabler; and
    an ambiguous symbol generator, wherein said generated ambiguous symbol has a value which can be read as either a first value or a second alternate value.

22. The DVD encoder according to claim 21 wherein said an error correction disabler comprises:
    an ECC block number selector;
    a row and column number selector; and
    an address comparator in communication with said ECC block number selector and said row and column number selector.

23. The DVD encoder according to claim 21 wherein said ambiguous symbol generator comprises:
    standard main conversion and substitution tables;
    at least one table of ambiguous symbols; and
    a selector in communication with said standard main conversion and substitution tables and said at least one table of ambiguous symbols, said selector determining which of said standard main conversion and substitution tables and said at least one table of ambiguous symbols to use for encoding at least one data symbol.

24. A DVD encoder comprising:
an invalid Reed-Solomon parity symbol generator.

25. A DVD disc comprising:
a signature, said signature having at least one ambiguity resulting from at least one ambiguous symbol inserted into an ECC block, during EFM+ encoding and having partially disabled error correction, said partially disabled error correction being produced prior to EFM+ encoding, wherein said ambiguous symbol has a value which can be read as either a first value or a second alternate value.

26. The DVD disc according to claim 25, wherein said at least one ambiguous symbol comprises:
at least one encoded data symbol in at least one byte in at least one column of the ECC block, said at least one encoded data symbol being the corresponding ambiguous representation of said at least one data symbol.

27. The DVD disc according to claim 25, wherein said partially disabled error correction comprises:
at least one invalid outer parity symbol (P0); and
at least one invalid inner parity symbol (PI).

28. The DVD disc according to claim 25, wherein said partially disabled error correction further comprises:
at least one substituted outer parity symbols (P0); and
at least one substituted inner parity symbol (PI).

29. The DVD disc according to claim 25, wherein said DVD is authentic if generally more reads are required to sucessfully read a processed sector than an unprocessed sector.

30. The DVD disc according to claim 25, wherein said DVD is authenic if generally more time is required to successfully read a processed sector than an unprocessed sector.

31. A DVD disc comprising:
means for producing a signature on a DVD disc, said signature comprising:
means for partially disabling error correction prior to EFM+ encoding; and
means for introducing at least one ambiguous symbol into an ECC block during EFM+ encoding, said ambiguous symbol having a value which can be read as either a first value or a second alternate value.

* * * * *